(12) United States Patent
DiStasio et al.

(10) Patent No.: US 7,940,715 B2
(45) Date of Patent: May 10, 2011

(54) ENTROPIC BASED ACTIVITY PASSIVE DETECTION AND MONITORING SYSTEM

(75) Inventors: Marcello M. DiStasio, Syracuse, NY (US); Christopher T. Bock, Cazenovia, NY (US)

(73) Assignee: SRC, Inc., North Syracuse, NY (US)

(*) Notice: Subject to any disclaimer, the term of this patent is extended or adjusted under 35 U.S.C. 154(b) by 41 days.

(21) Appl. No.: 12/396,519

(22) Filed: Mar. 3, 2009

(65) Prior Publication Data

US 2010/0226255 A1    Sep. 9, 2010

(51) Int. Cl.
*H04B 7/185*    (2006.01)

(52) U.S. Cl. ..... 370/318; 370/241; 370/315; 455/67.11; 709/224

(58) Field of Classification Search .................. None
See application file for complete search history.

(56) References Cited

U.S. PATENT DOCUMENTS

| | | | |
|---|---|---|---|
| 2002/0127987 A1* | 9/2002 | Kent | 455/255 |
| 2003/0096629 A1* | 5/2003 | Elliott et al. | 455/522 |
| 2003/0169762 A1* | 9/2003 | Wee Ho et al. | 370/450 |
| 2004/0032825 A1* | 2/2004 | Halford et al. | 370/208 |
| 2004/0166877 A1* | 8/2004 | Spain et al. | 455/456.1 |
| 2005/0176406 A1* | 8/2005 | Krishnakumar et al. | 455/410 |
| 2005/0245252 A1* | 11/2005 | Kappes et al. | 455/423 |
| 2006/0050698 A1* | 3/2006 | Aytur et al. | 370/389 |
| 2009/0005061 A1* | 1/2009 | Ward et al. | 455/456.1 |
| 2009/0196343 A1* | 8/2009 | Cho et al. | 375/240.02 |

* cited by examiner

*Primary Examiner* — Donald L Mills
(74) *Attorney, Agent, or Firm* — George R. McGuire; Frederick J. M. Price; Bond Schoeneck & King, PLLC

(57) ABSTRACT

The present invention relates generally to computer systems in the field of signals intelligence, and more particularly, to entropic activity detection and monitoring computer systems for collecting and analyzing data packets wirelessly transmitted from a wireless transmitter by applying information theoretic metrics (Tsallis entropy).

20 Claims, 26 Drawing Sheets

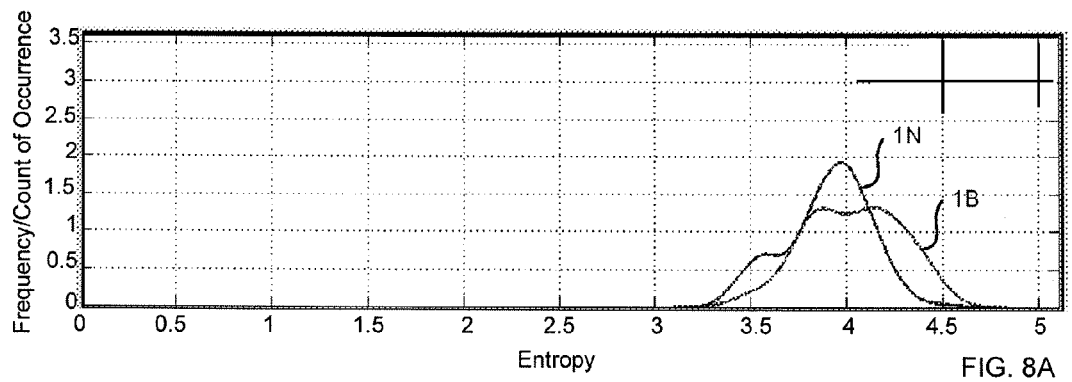
FIG. 8A
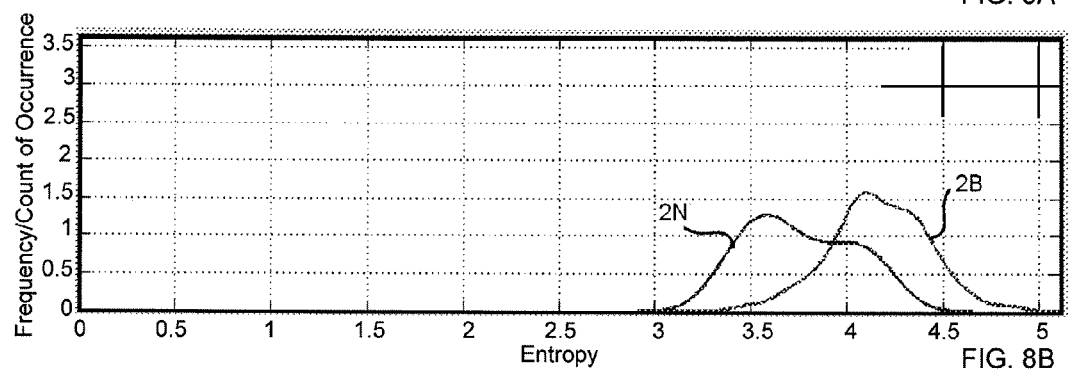
FIG. 8B
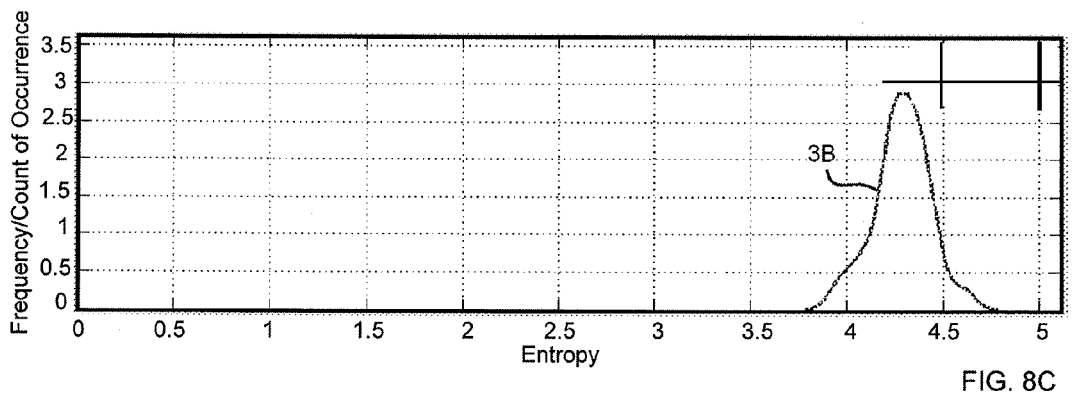
FIG. 8C
FIG. 8

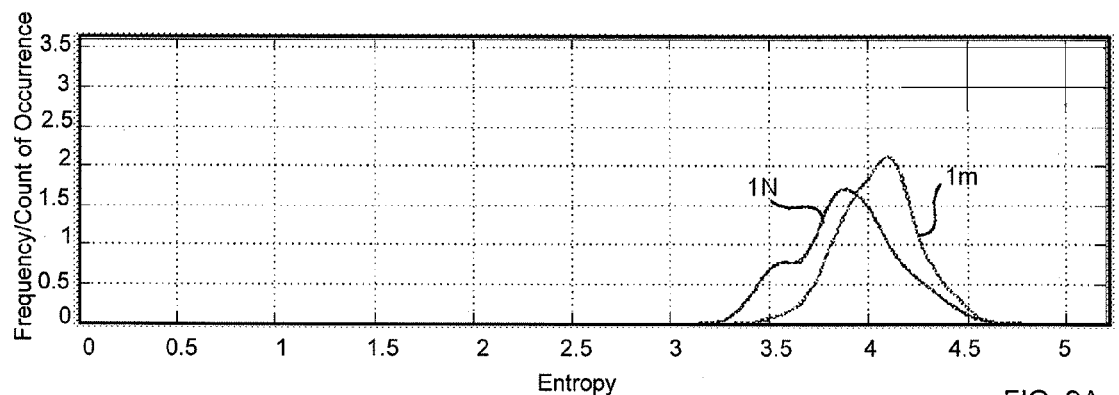
FIG. 9A
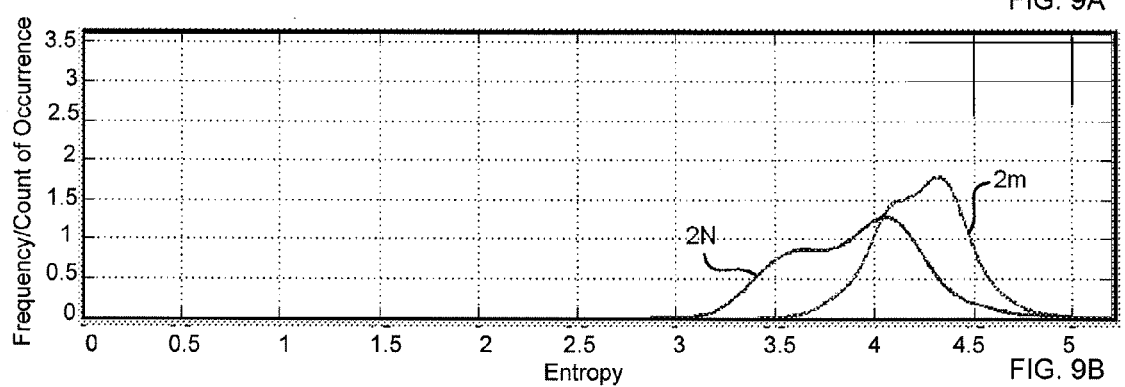
FIG. 9B
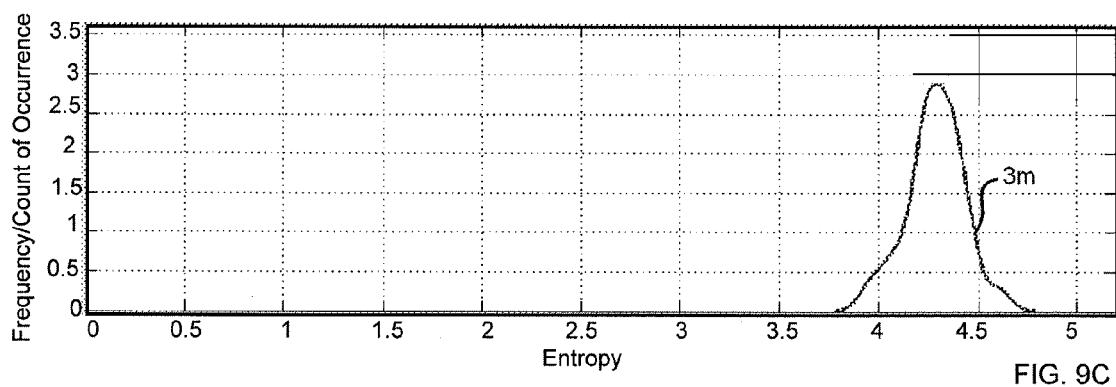
FIG. 9C
FIG. 9

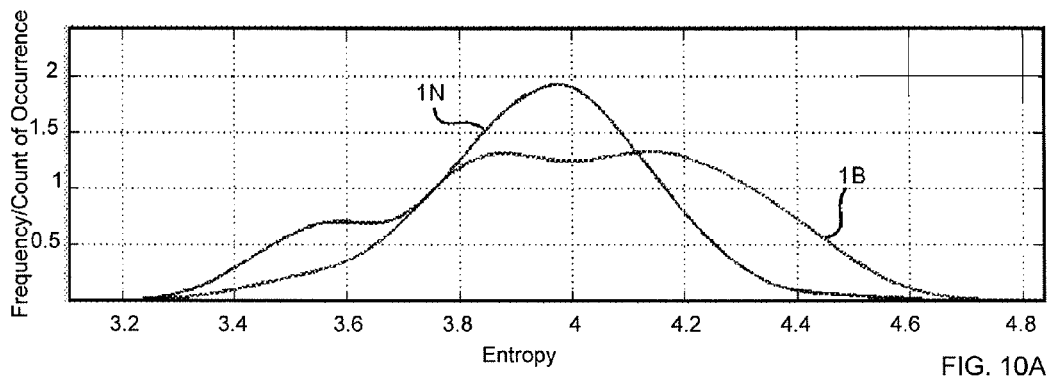
FIG. 10A
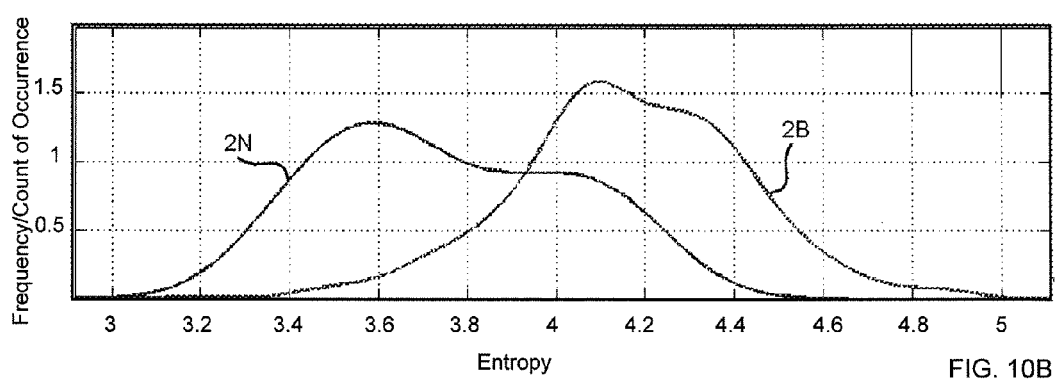
FIG. 10B
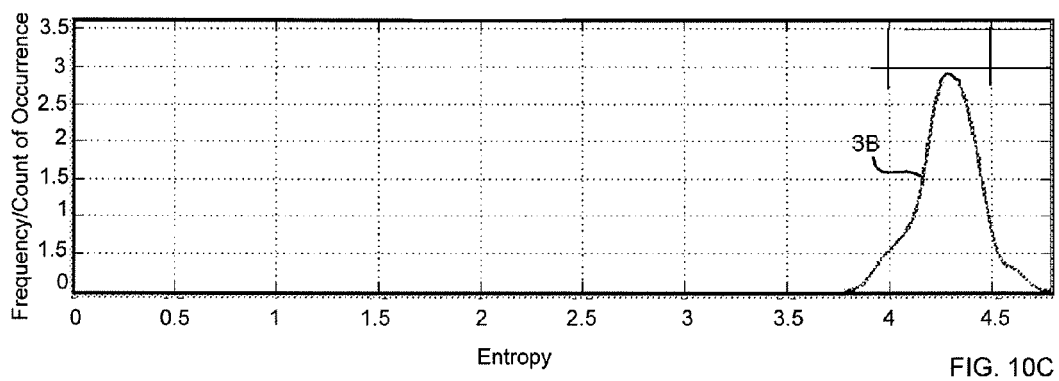
FIG. 10C
FIG. 10

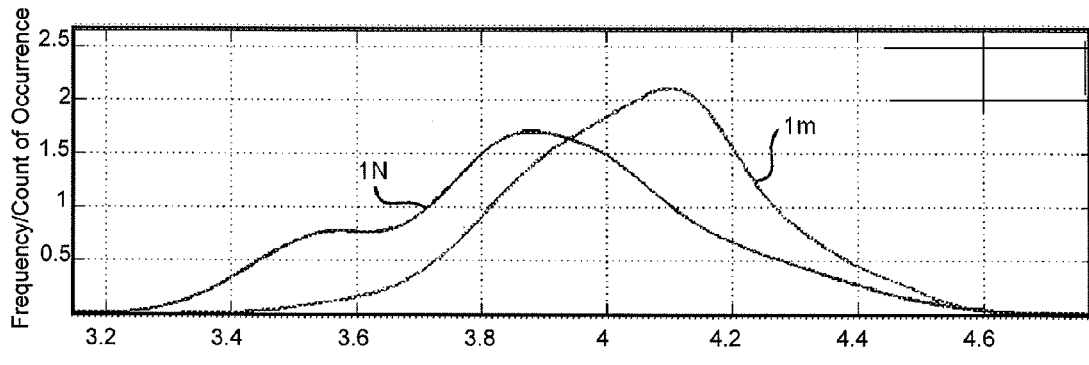
FIG. 11A
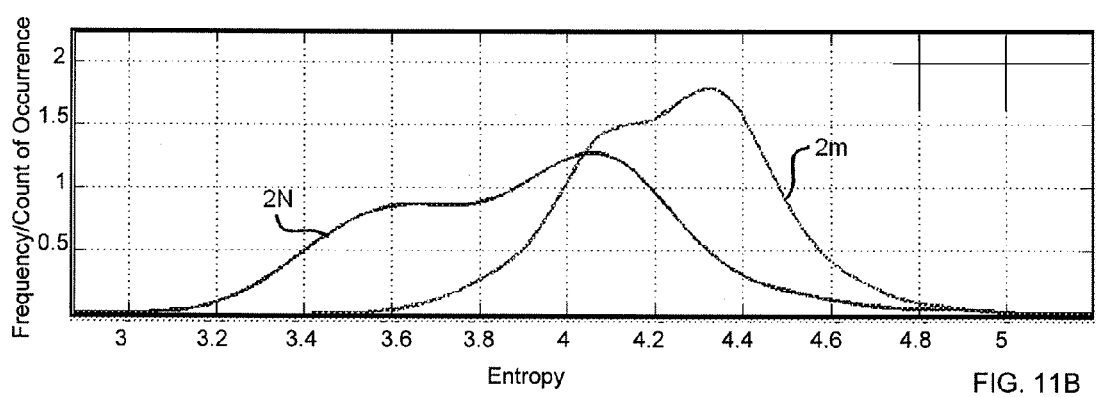
FIG. 11B
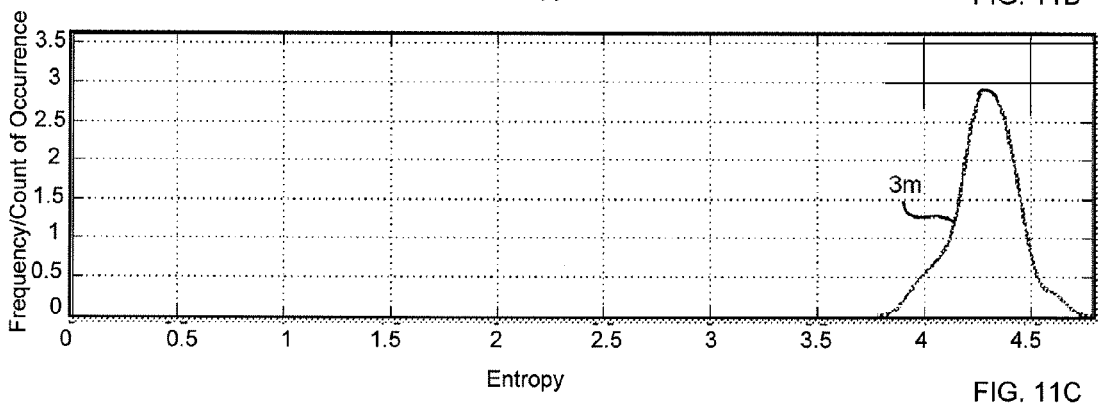
FIG. 11C
FIG. 11

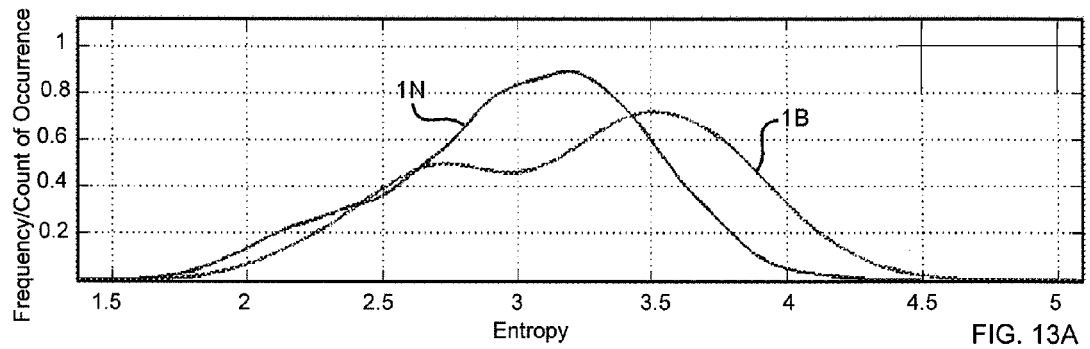
FIG. 13A
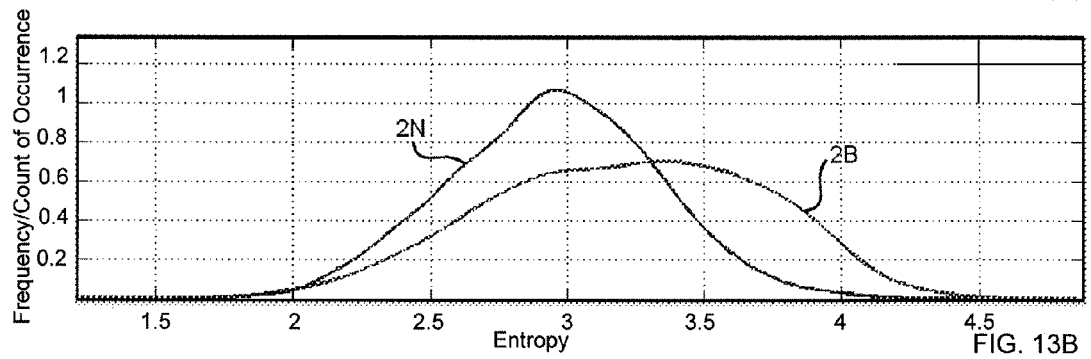
FIG. 13B
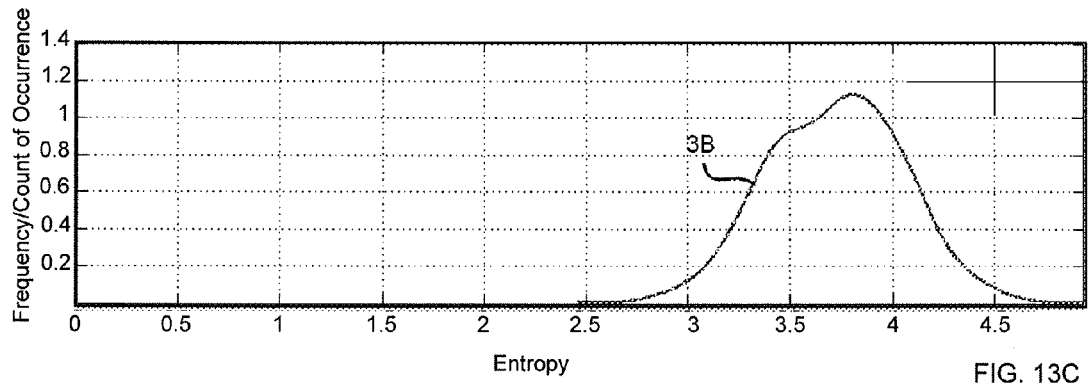
FIG. 13C
FIG. 13

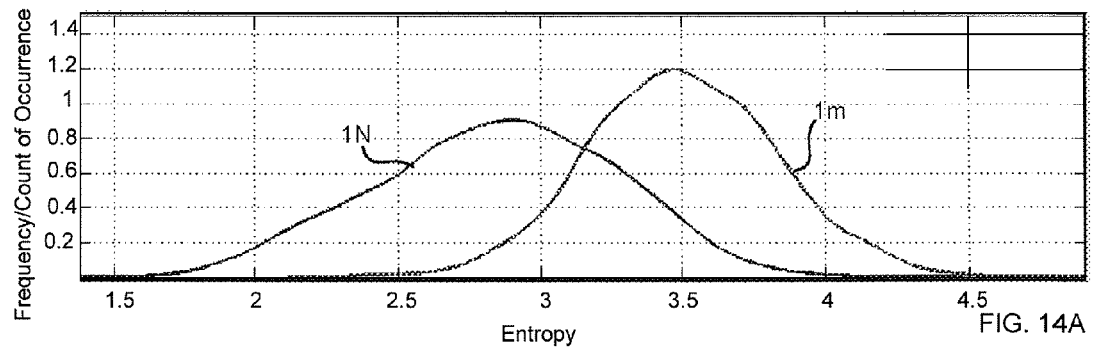
FIG. 14A
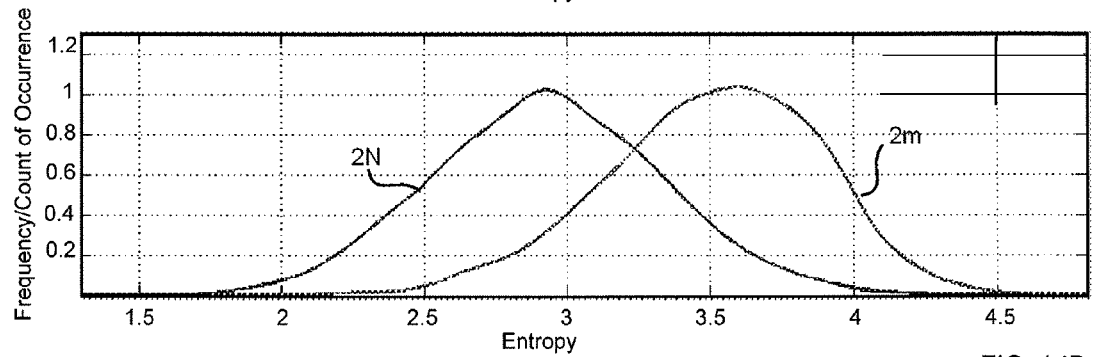
FIG. 14B
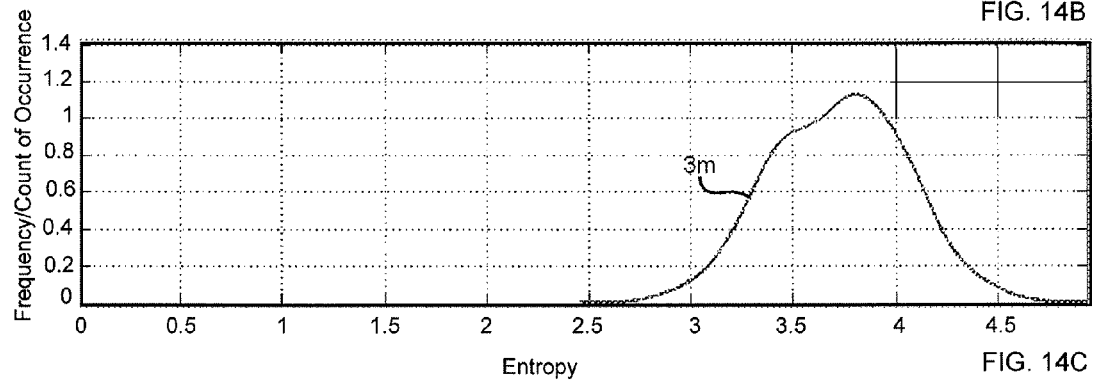
FIG. 14C
FIG. 14

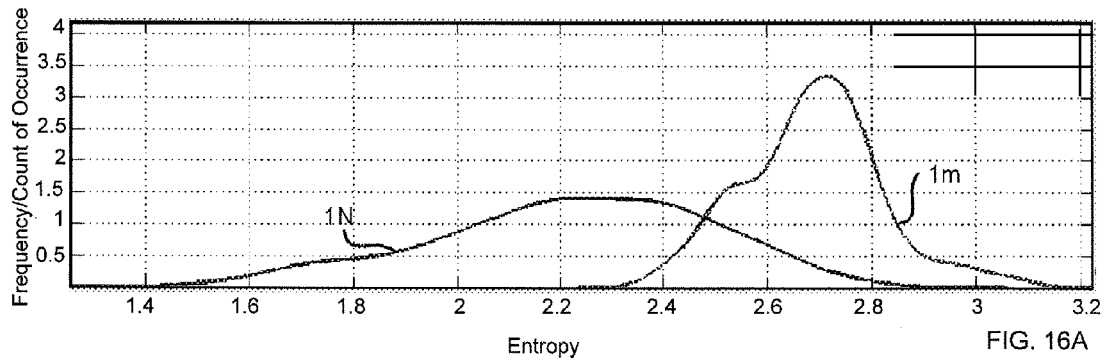
FIG. 16A
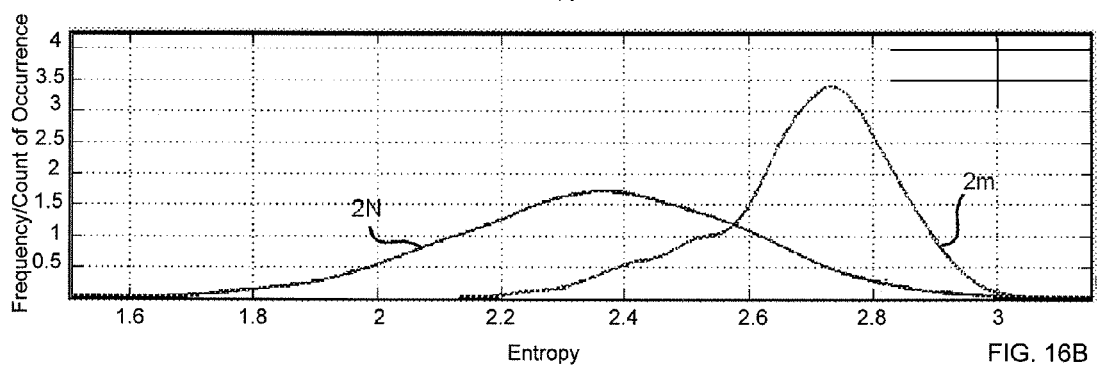
FIG. 16B
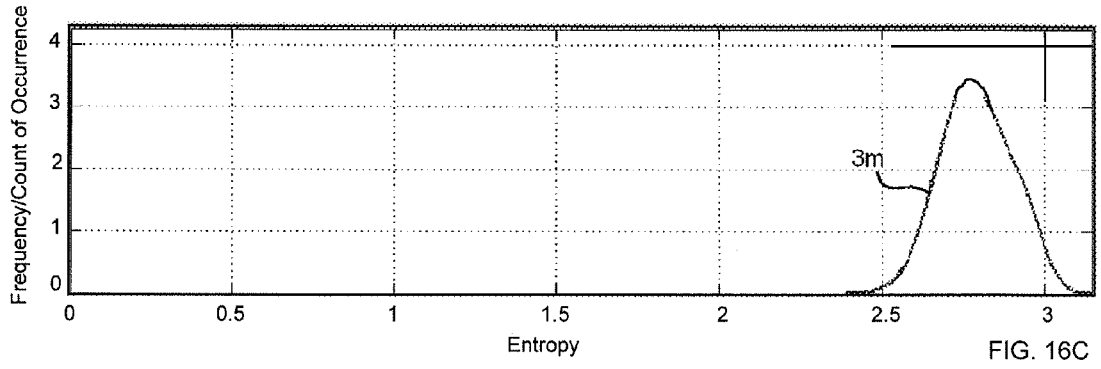
FIG. 16C
FIG. 16

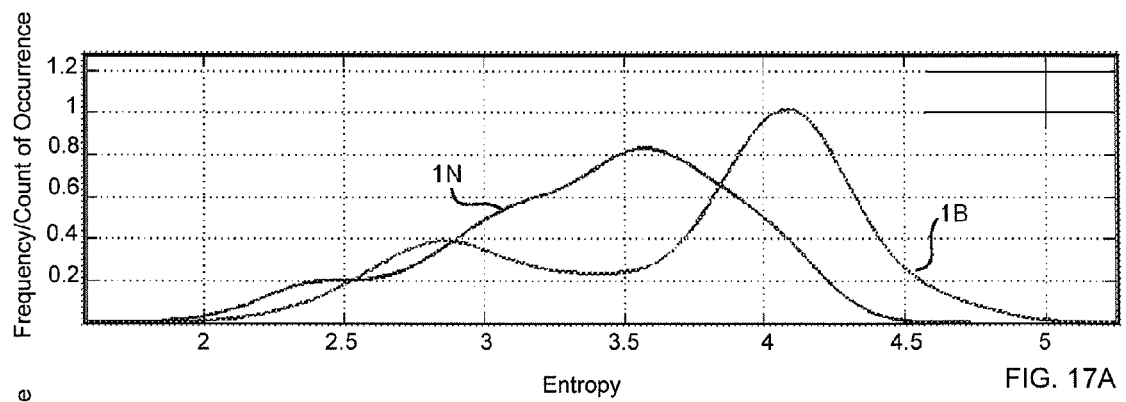
FIG. 17A
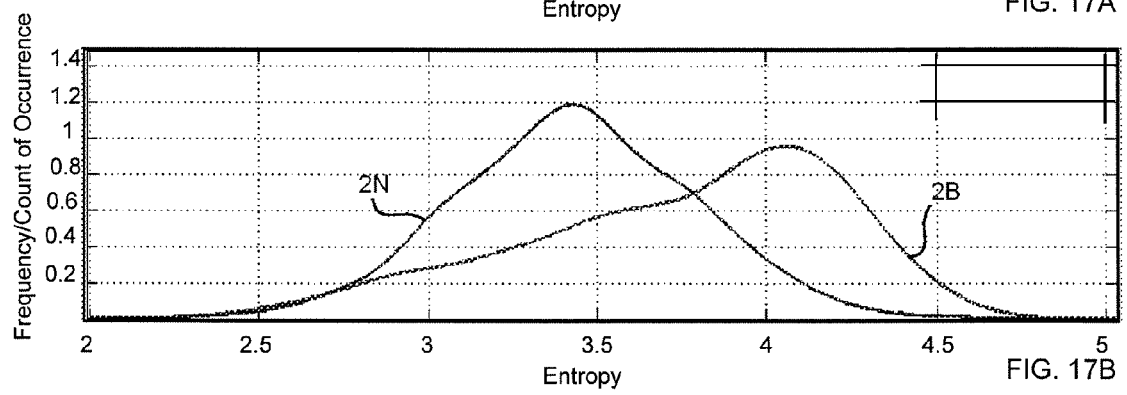
FIG. 17B
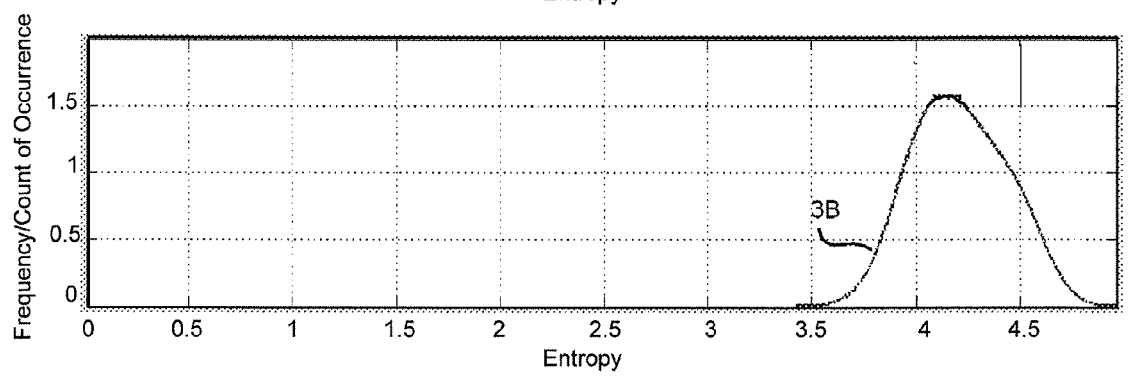
FIG. 17C
FIG. 17

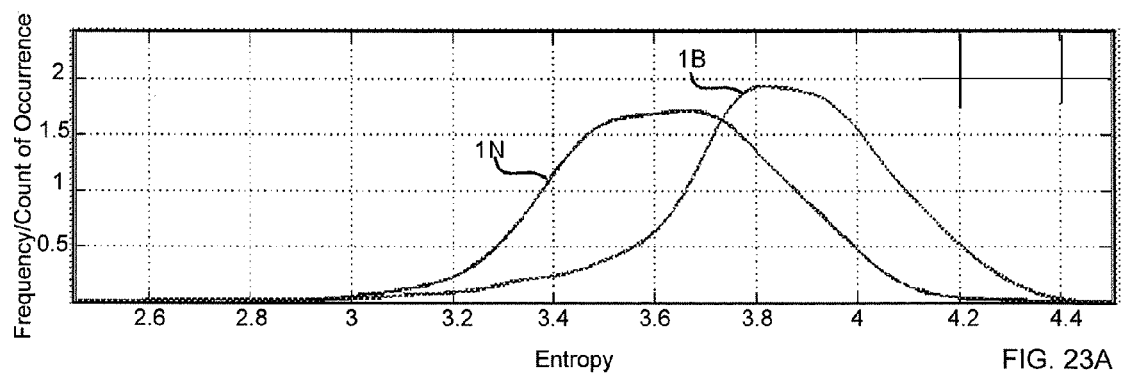
FIG. 23A
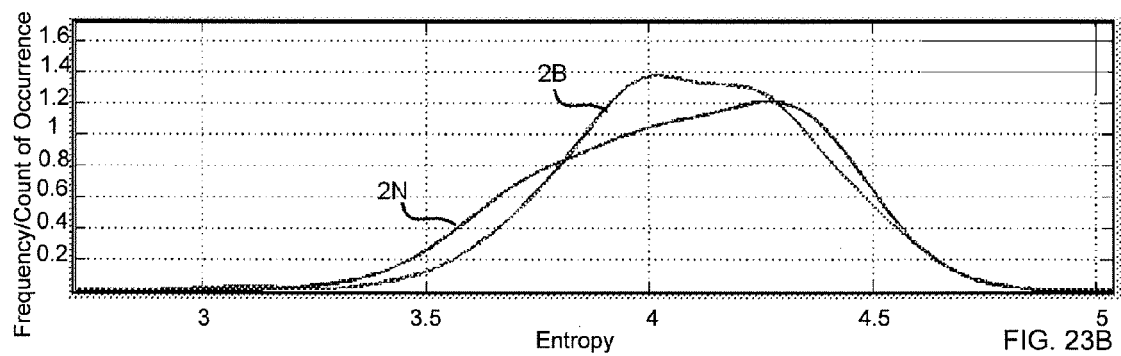
FIG. 23B
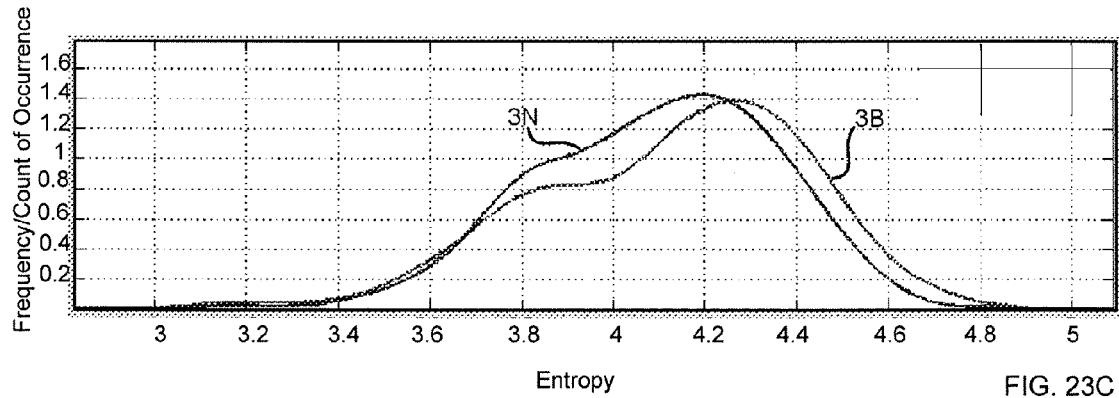
FIG. 23C
FIG. 23

ENTROPIC BASED ACTIVITY PASSIVE DETECTION AND MONITORING SYSTEM

BACKGROUND OF THE INVENTION

1. Field of Invention

The present invention relates generally to computer systems in the field of signals intelligence, and more particularly, to entropic activity detection and monitoring computer systems for collecting and analyzing data packets wirelessly transmitted from a wireless transmitter by applying information theoretic metrics (Tsallis entropy).

2. Description of Prior Art

The field of signals intelligence (often contracted to SIGINT) is any intelligence-gathering by interception of signals (including, but not limited to electromagnetic signals), including, but not limited to interception of signals between (i) people; (ii) machines; and/or (iii) people and machines. SIGINT is not necessarily limited with respect to: (i) encryption; (ii) sensitivity of the information; (iii) use of cryptanalysis; and/or (iv) method of interception. It does concern itself with remotely monitoring signals for the purpose of exploiting the received data or signals to detect, monitor and track sources of interest. This may be cooperative sources but more often than not it is surreptious surveillance and as such involves noncooperative focal points.

Remote detection and monitoring is a type of signals intelligence. Current approaches to remote detection and monitoring includes active systems/methods. Active surveillance entails transmission of an interrogating probe (e.g., acoustic, electromagnetic, optical, etc.) into the space of interest. This type of surveillance is overt, intrusive and detectable, all of which are undesirable for most surveillance applications, many of which need to remain covert. In addition, most active methods require special purpose hardware and software. For example, the electromagnetic domain ultra wideband (UWB) based techniques radiate high repetition rate electromagnetic (EM) pulses into an interrogation space and process the reflected energy. UWB requires complex, sophisticated and expensive hardware and signals processing systems, is still in the test and development phase, and most importantly is greatly hampered by regulatory spectrum management issues. Among these spectrum issues is the potential interference with Global Positioning (GPS) signals.

SUMMARY OF THE INVENTION

It is therefore a principal object and an advantage of the present invention to remotely and passively detect and monitor activity in areas of interest, such as in complex radio frequency (RF) environments (e.g., urban and building interiors), by the characterization of transmitter behaviors in such environments.

It is another object and advantage of the present invention to provide remote activity monitoring via measurements of information transmitted from a wireless transmitter for (1) security system functions such as intrusion detection and location, and alarm/alert functions, (2) intelligence operations in an urban environment, (3) situational awareness for urban operations such as hostage recovery and support for interdiction, (4) covert surveillance, and (5) police, military, and/or paramilitary actions requiring remote surveillance, and the like.

It is further object and advantage of the present invention to provide remote passive detection and monitoring of human activity in at least a partially bounded region (and preferably a fully bounded region), which may be effected regardless of the presence of intervening structural elements such as walls. This detection and monitoring can be accomplished via passive surveillance of common RF signals, for example.

It is an additional object and advantage of the present invention to provide a system that exploits the effect of people on the RF signal received by a receiver of RF signals to passively determine the presence and number of humans within a room. The effect is to perturb the signal by increasing the multipath associated with the transmission. Multipath means that the signals can propagate from a transmitter to a receiver by a variety of paths. Each path may result in a slightly different time of arrival at the receiver, but close enough to be accepted by the receiver as a signal component. The present invention exploits the degree of variability that a person (or persons) impress on the transmitted signal.

It is a further object and advantage of the present invention to provide a system which utilizes Tsallis Entropy of received signal strength (measurement of power present in a received radio signal) from a transmitter as a measure of human activity/presence in at least a partially bounded region, and preferably a fully bounded region.

In accordance with the foregoing objects and advantages, an embodiment of the present invention provides computer systems in the field of signals intelligence, and more particularly, entropic activity detection and monitoring computer systems for collecting and analyzing data packets wirelessly transmitted from a wireless transmitter by applying information theoretic metrics (Tsallis entropy).

In accordance with another embodiment of the present invention, a computer system including but not limited to means for collecting data packets wirelessly transmitted from a wireless transmitter; means for estimating a histogram for N samples of packets; means for normalizing the histograms; means for calculating the Tsallis entropy based on the normalized histograms; means for filtering the output from the calculation; and means for graphically representing Tsallis entropy as a function of time based on the filtered output is provided. The wireless data packets that are collected can each have some level of entropy based on the variability of the received power of the data packet, with the higher levels of entropy most likely being caused as a consequence of higher activity levels occurring between the wireless transmitter and the data collection module. Therefore, by measuring the entropy of the data packets over a set period of time, the level of activity in the space in which the transmitter and data collection device are located can be predicted.

In accordance with a further embodiment of the present invention, a passive electromagnetic based method/technique that relies upon an emitter of convenience in a vicinity of interest to detect and monitor human activity is provided. The technique can be unobtrusive and undetectable by those being monitored. It can be implemented with hardware and software that is readily available and simple to use. In addition the basic phenomenology is such that the technique is not limited to the industrial, scientific, and medical (ISM) radio frequency band (a radio frequency band typically used in wireless network transmissions), and can be applied to other electromagnetic bands (e.g., 802.11 WiFi, cordless phones). The method involves monitoring the entropy of received signal strength. This metric allows the system to be independent of a priori information of the transmitter's configuration, geometry or setting. In addition there is no dependence on any communication link activity or information.

BRIEF DESCRIPTION OF THE DRAWINGS

The present invention will be more fully understood and appreciated by reading the following Detailed Description in conjunction with the accompanying drawings, in which:

FIG. 8a-c is a graphical illustration often second Tsallis entropy probability density plots in three separate graphs, according to an embodiment of the present invention.

FIG. 9a-c is graphical illustration often second Tsallis entropy probability density plots in three separate graphs, according to an embodiment of the present invention.

FIG. 10a-c is a graphical illustration of ten second Tsallis entropy probability density plots in three separate graphs, according to an embodiment of the present invention.

FIG. 11a-c is a graphical illustration of ten second Tsallis entropy probability density plots in three separate graphs, according to an embodiment of the present invention.

FIG. 13a-c is a graphical illustration of one second Tsallis entropy probability density plots in three separate graphs, according to an embodiment of the present invention.

FIG. 14a-c is a graphical illustration of one second Tsallis entropy probability density plots in three separate graphs, according to an embodiment of the present invention.

FIG. 16a-c is a graphical illustration of five second Tsallis entropy probability density plots in three separate graphs, according to an embodiment of the present invention.

FIG. 17a-c is a graphical illustration of five second Tsallis entropy probability density plots in three separate graphs, according to an embodiment of the present invention.

FIG. 23a-c is a graphical illustration of five second Tsallis entropy probability density plots in three separate graphs, according to an embodiment of the present invention.

DETAILED DESCRIPTION

Figure 1:
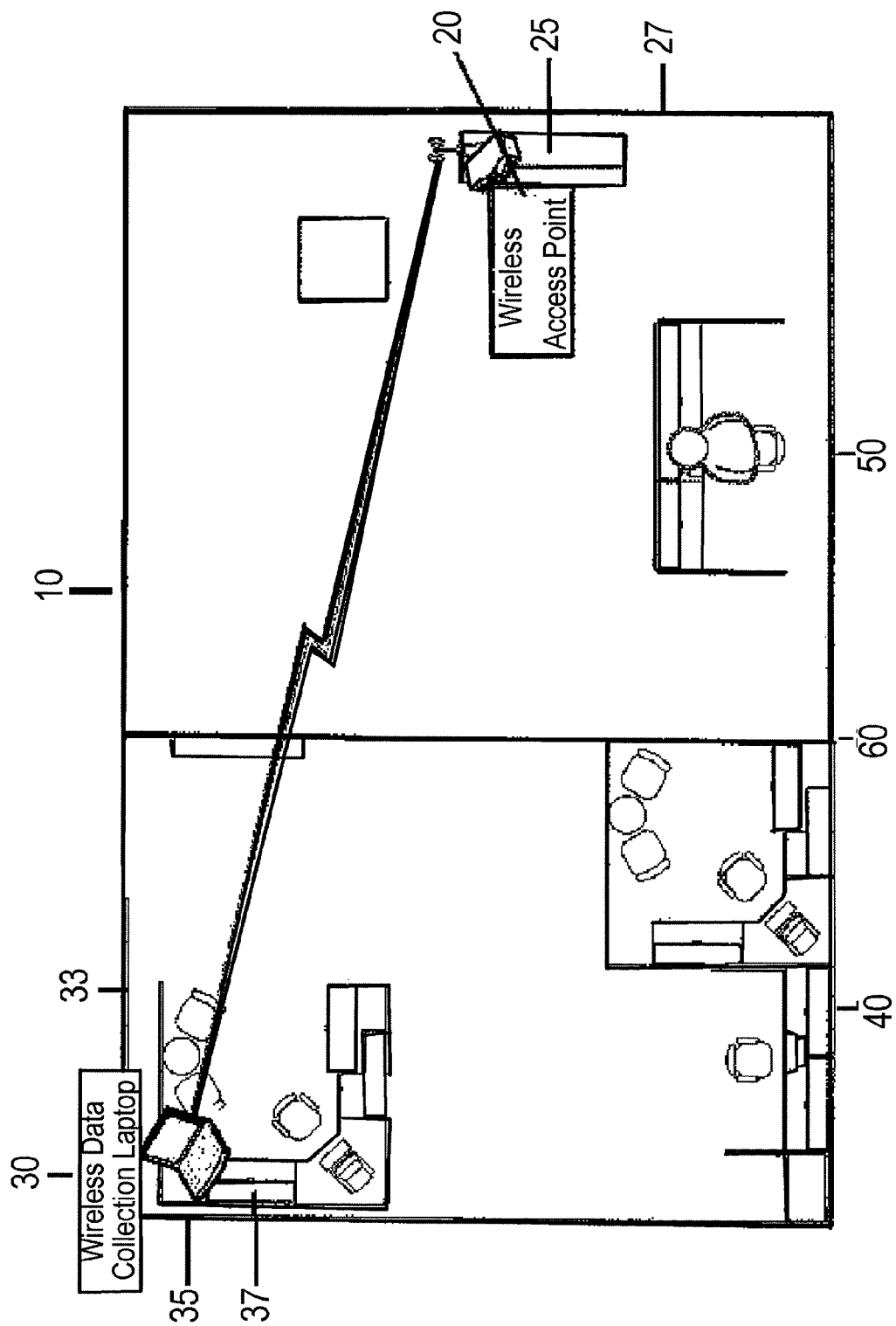
FIG. 1 is an illustrative diagram that shows a data packet collection and monitoring system according to an embodiment of the present invention.

The present invention will be more fully understood and appreciated by reading the following Detailed Description in conjunction with the accompanying drawings, wherein like reference numerals refer to like components.

In accordance with an embodiment of the present invention computer systems in the field of signals intelligence, and more particularly, entropic activity detection and monitoring computer systems for collecting and analyzing data packets wirelessly transmitted from a wireless transmitter by applying information theoretic metrics (Tsallis entropy), is provided.

Advantages of the invention are illustrated by the following Examples. However, the particular materials, amounts thereof, products, physical testing equipment and/or machines recited in these examples, as well as other conditions and details, are to be interpreted to apply broadly in the art and should not be construed to unduly restrict or limit the invention in any way.

In accordance with an embodiment of the present invention, a purpose of the experiments described in the Examples was to investigate the utility of Tsallis entropy to 802.11 (a set of standards for wireless local area network (WLAN) computer communication, which should be appreciated by those skilled in the art) data, and to determine (and show) if activity near a wireless transmitter can be inferred by estimating the entropy of received signal power.

EXAMPLE 1

This Example describes exploratory experiments that were performed on 802.11 including long term continuous collection of packet data transmitted by a wireless router, in accordance with an embodiment of the present invention.

As shown in FIG. 1, a data packet collection and monitoring system 10 including but not limited to a wireless access point 20 and a wireless data collection platform 30 is illustrated. FIG. 1 also shows two rooms of a building, 40 and 50, separated by wall 60. Wireless access point 20 is shown in room 50, positioned on a shelf 25 near wall 27. Wireless data collection platform 30 (e.g., a laptop) is shown in room 40, positioned on a desk 35 in the corner near walls 33 and 35. The wireless data collection platform 30 acts as a passive collector; it does not establish a communication link with the wireless access point 20. (The actual equipment used for these experiments included a Linksys wireless access point (model WRT54g) and a Dell Laptop with a wireless NIC, which is running a packet capture software package). The data packet collection and monitoring system 10 is adapted to capture data packets either continuously or for a selected period. Since the system can work with any packets, it is able to use "Beacon" packets which the transmitting system uses to broadcast to the world that it is available; therefore the system does not need any communication link to be established, it estimates the received signal power associated whatever packet it receives.

A collection time period was set for six days. The wireless access point 20 was Wired Equivalent Privacy (WEP) enabled (a deprecated algorithm to secure IEEE 802.11 wireless networks), and communications were not exercised except in a few short instances. All data packets were monitored and recorded, and the signal strength data from the wireless access point 20 was processed and analyzed as shown in FIG. 2, described below.

The results show that the total amount of data packets accounts for less than 1.75% over the observation period. The vast majority of packets collected and analyzed were Beacon packets (packets that advertise the presence of an access point) from the wireless access point 20 (60%).

Figure 2:
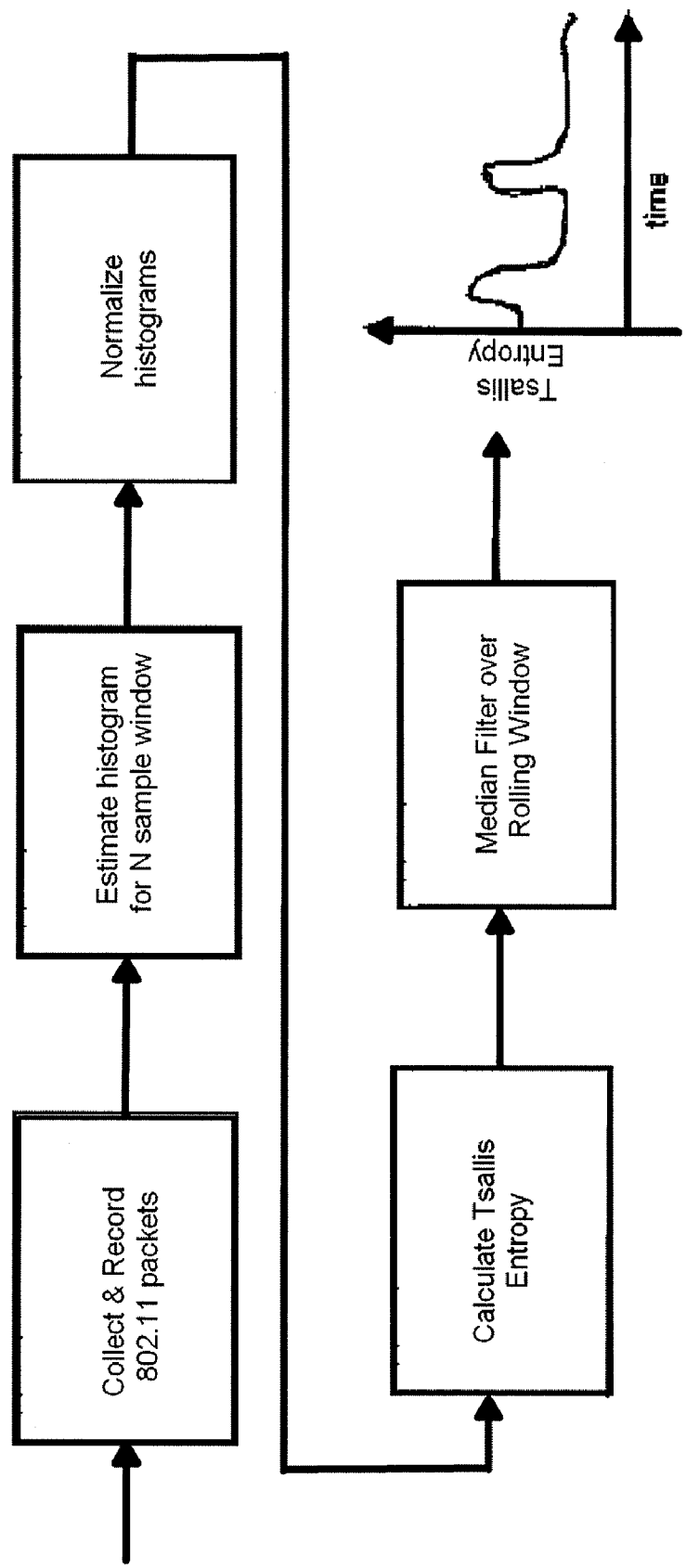
FIG. 2 is a flow diagram that illustrates the steps in the processing applied to packet data according to an embodiment of the present invention.

As shown in FIG. 2, a flow diagram showing the steps in the processing applied to packet data is illustrated, according to an embodiment of the present invention. At step 100, 802.11 Beacon data packets were wirelessly transmitted from the wireless access point 20, and collected and recorded by the wireless data collection platform 30. At step 200, the received signal strength of the collected packet data (received signal strength is determined per received/collected data packet) was used to develop histograms (probability density estimate—frequency of occurrence of given signal strength of data packets versus signal strength) over a set window length or time period (e.g., five minute window—autocorrelation measures of the signal strength data indicated that this was a sufficient period for independent measures). At step 300, the histograms were then individually normalized by dividing the frequency of occurrence counts per bin by the total number of counts, which is the sum over all bins and displayed. The behavior of the histogram data for the entire collection period is shown in FIG. 3.

Figure 3:
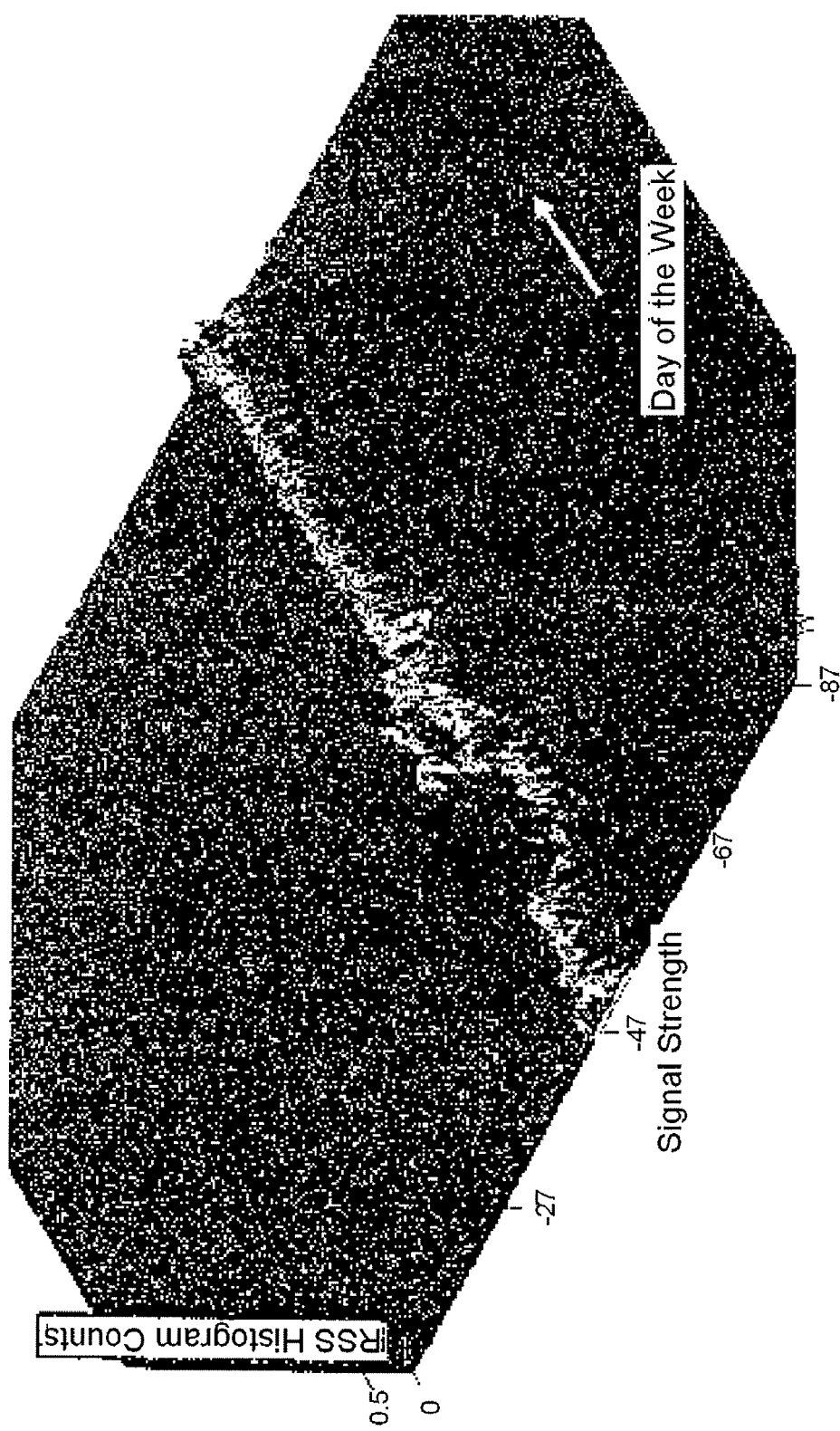
FIG. 3 is a surface plot of signal strength histogram vs. time/date according to an embodiment of the present invention.

As shown in FIG. 3, the histogram plot illustrates a distinct set of humps for several days. The results show that the weekdays' working hours period corresponded to the bimodal distributions.

At step 400 of FIG. 2, the normalized histograms from step 300 were used for Tsallis entropy calculations (and the resulting entropy for the sample window was then filtered and displayed, as discussed below).

In accordance with an embodiment of the present invention, Tsallis entropy is a concept that has been explored in the time and spatial domains. The application of the information theoretic Tsallis entropy to the behavior of complex (multipath plus signal and noise) RF field probability distribution functions' temporal and spatial properties is provided herein.

As understood by those skilled in the art, Tsallis entropy was proposed in 1988 by Constantino Tsallis of Brazil as a generalization of the Shannon entropy that has proven useful in segmentation problems in image processing. Tsallis entropy is based on a generalized entropic form, $$S_q = \frac{1 - \sum_{i=1}^{k} (p_i)^q}{q-1}$$

where $S_q$ is the Tsallis entropy, $p_i$ is the probability density value for the $i^{th}$ value, k is the number of bins in the histograms, the real number q is a entropic index that characterizes the degree of nonextensivity (Tsallis entropy has a nonextensive property for statistical independent systems, defined by the additivity rule $Sq(A+B)=Sq(A)+Sq(B)+(1-q)\cdot Sq(A)\cdot Sq(B)$ for two systems A and B).

Accordingly, per step 400 as shown in FIG. 2, the Tsallis entropy (with q=0.75) was estimated for each histogram data set. The results showed that the output from the Tsallis entropy calculation in step 400 was somewhat noisy. Therefore, at step 500 in FIG. 2, a median filter was applied to the time series (output). At step 600 of FIG. 2, Tsallis entropy as a function of time based on the filtered output is graphically represented.

Figure 4:
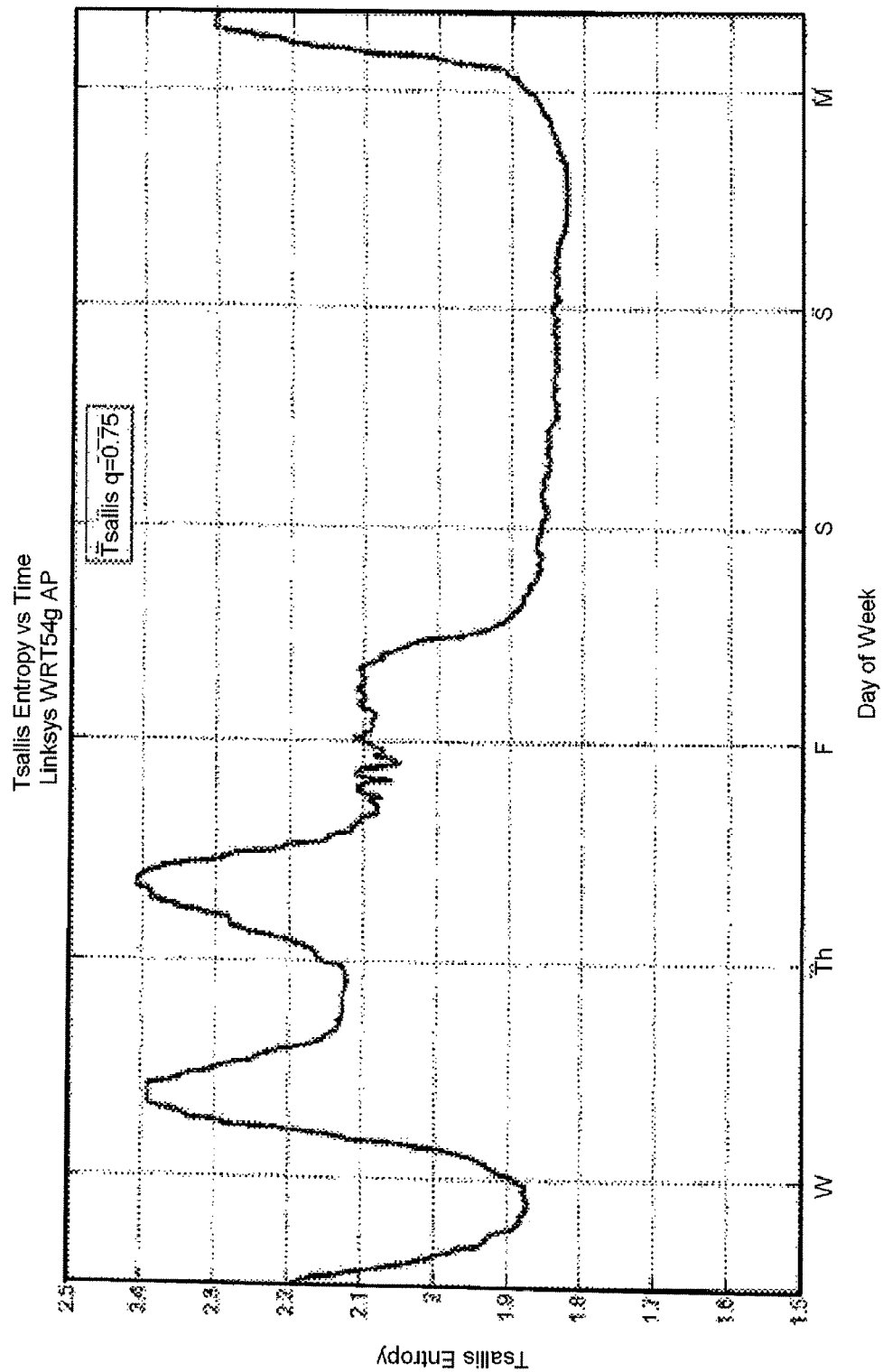
FIG. 4 is a graphical illustration of Tsallis entropy vs. time for a wireless transmitter according to an embodiment of the present invention.

As shown in FIG. 4, the results of the graphical representation of the Tsallis entropy as a function of time based on the filtered output of the median filter is illustrated. As shown in FIG. 4, these exploratory experiments illustrated that during analysis of the received signal power associated with the packet data, a bimodal probability distribution was present; as shown here the peaks are due to human activity. The results shown in FIG. 4 suggest that the Tsallis entropy correlates with some phenomenology. The phenomenology is not the data packet rate which is constant for the period of observations; it is not the packet type composition since the AP's Beacon packets dominate the sample set; and it is not related to a change in communications between a user and the wireless access point 20 since there was a vanishing small amount of data packets involved (<1.75%), which was only for very brief periods. The results do show, however, that a type of external influence is the prime candidate for the agent of the phenomenology. The results showed that the RF signature from a given wireless access point 20 (see FIG. 2) appears to vary with the activity cycle in its vicinity (e.g., human), and the unique Tsallis Entropy measure exposed this activity behavior. Among the possibilities are temperature, vibration, power fluctuations and lastly the presence and motion of people in the intervening space. The last item is most plausible since the presence of individuals in the office space provides an absorptive scattering body that may cause consistent changes to the power distribution function received by the collection platform (i.e., high entropy shown during normal work day hours).

In other words, in accordance with an embodiment of the present invention, it was discovered that it is the effect of personnel presence and motion on the received RF signal strength itself that is the mechanism for the variation of the Tsallis entropy in the identifiable manner discussed above. The RF signals can thus be used to calculate packet data entropy to then monitor activity in places such as buildings. Accordingly, this represents a very unique and potentially effective means for remotely, passively monitoring activities in the neighborhood of an electromagnetic source. Moreover, this phenomenology may be extended to other frequency bands beside the ISM band.

The significance of this finding is that in a tactical environment, a user may be able to detect the presence or absence of activity of a location served by a wireless access point regardless of the client software or hardware activity. A hypothesis was made that this behavior was connected to human activity in the vicinity of the wireless router. As a result, further experiments were conducted to test this hypothesis, and focused on characterizing the properties of wireless access points in simple geometries, representative of building interiors, as further illustrated by the following Examples.

EXAMPLE 2

This Example describes a controlled experiment in an anechoic chamber that was performed to provide further evidence that the entropy variance shown in FIG. 4 was caused by human activity rather than RF interference.

A different example of a Linksys wireless access point (model WRT54g) was placed at one end of the anechoic chamber and the sampling unit (Dell laptop with a wireless NIC) used in the Examples above was placed at the other end of the chamber at approximately the same height. The sampling unit was set off collecting packets. A histogram of signal power levels was created from each 1000 packet file (not shown). The Tsallis entropy, with Q=0.75, of each of these histograms was then calculated.

Figure 5:
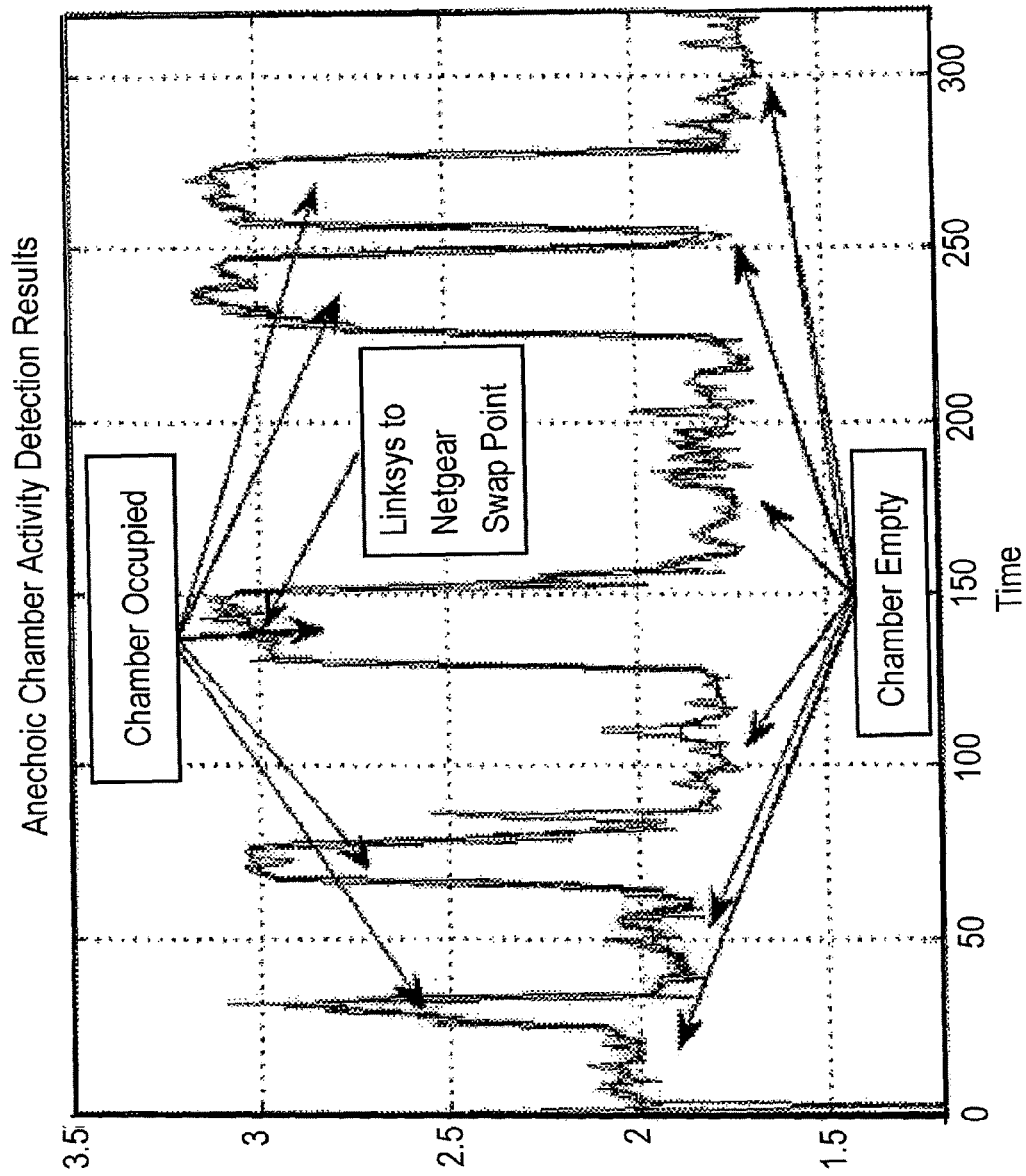
FIG. 5 is a graphical illustration of Tsallis entropy vs. time as measured in an anechoic chamber according to an embodiment of the present invention.

Shown in FIG. 5 are the results shown for a raw entropy calculation and for a five point median filtered version. The raw, unfiltered version is more jagged but both results show that the entropy of the histograms is roughly 50% greater when there is someone in the chamber than when there is not.

Also notable in FIG. 5, is that midway through the experiment the Linksys wireless access point was replaced with a Netgear wireless access point (model WGT624). The observed entropy exhibits the same behavior and at nearly the same levels. This demonstrates that the activity measure is independent of the specific equipment manufacturer.

The following Examples describe experiments that were combined into multiple groups of 18-54 experiments collectively known as an experiment set ("ES"). Each ES contained a number of individual experiments/tests lasting approximately five minutes each, and were performed in succession as a set.

These Examples show a system with the capability to detect the presence of one or more individuals within a space. Certain factors enhance this capability. Specifically, it is shown that if the individual(s) are moving, or if the individual(s) are within the line of sight between the transmitter and receiver, the capability to detect the presence of one or more individuals within a space was enhanced. The experiments described below in the Examples were performed in order to establish the capability for activity detection.

Briefly, the analysis of the data collected has shown: the capability of the system of an embodiment of the present invention to detect the presence of one or more individuals; that the presence of a stationary individual within the testing area caused a change in the entropy of the received signal strength; that the motion of the person (people) caused a drastic difference indicating that motion is a significant factor in the measurement; and whether the individual was blocking the line of sight or not had less effect on the entropy histogram if the individual was stationary rather than moving.

The same hardware was used for the entire set though not necessarily across sets. This was done to evaluate the repeatability of the process across different hardware platforms. Each set can be characterized by the testing goal of the set.

The following physical testing equipment was used for the experiment sets: Dell Laptop—Model: Latitude model D610; Cardbus 802.11 wireless network interface (NIC)—Model: CB9; Linksys 802.11 wireless router—Model: WRT54G; second "control" laptop; a stopwatch; and a tape measure.

Three people were used for the given experiments. Person's roles remained constant throughout the course of the experiment (e.g. "Person 1" was always the same person). When a person was "occupying" a space, it was assumed they were remaining as stationary as possible. When a person was moving, their rates were specified per the experiment.

EXAMPLE 3

This Example describes the testing goal of ES1. ES1 was designed to formalize and validate the results from preliminary temporal variation experiments discussed above. The tests performed during ES1 were designed to show that through utilizing the Tsallis entropy metric, the presence of individuals in a room could be determined. Tests were done in an anechoic chamber to minimize external signal interference.

Figure 6:
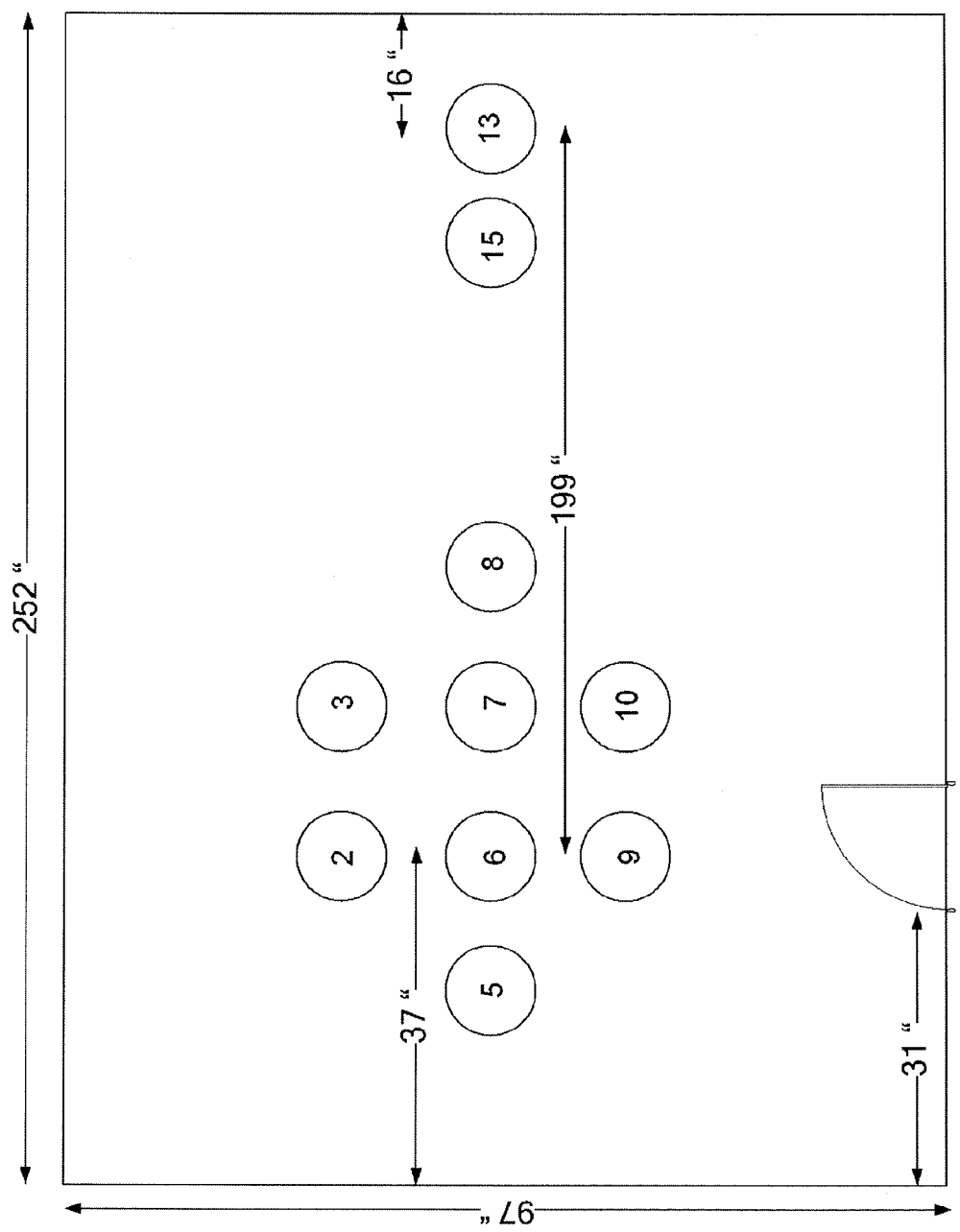
FIG. 6 is a graphical illustration of the physical dimensions of an anechoic chamber with relative position of test spots used, according to an embodiment of the present invention.

The physical dimensions of the anechoic chamber used are indicated in FIG. 6. The relative position of each of the test spots is also indicated (positions 2, 3, 5, 6, 7, 8, 9, 10, 13, and 15). The approximate number of wavelengths between receiver and the transmitter is 42. The number of wavelengths is based on the ~2.4 GHz frequency (stepping ignored) used by 802.11 yielding a wavelength of ~4.75 inches.

The wireless router was placed at one end of the anechoic chamber, and the Dell laptop (i.e., the wireless data collection platform/receiver) was placed at the other end. A packet capture software known as Packcap, a custom developed software system in accordance with an embodiment of the present invention, was loaded on the wireless data collection platform along with a software system EADM (Entropic Activity Detection and Monitoring), according to an embodiment of the present invention.

Both software suites were executed simultaneously. The Packcap program collected and logged in about 1000 packet increments. The EADM system continuously logged raw data coming off the User Datagram Protocol (UDP) socket, but did not log the instantaneous calculated entropies although these could be saved if desired.

The data was collected and analyzed as follows. The Packcap program collected data from the WiFi card. The data was logged to a comma delimited text file. Each 802.11 packet contains the packet type, source, address, the time at which the packet was sent, and a variety of other information in clear text regardless of the encryption setup on the network. The software driver for the Atheros chipset based WiFi adapters prepends a PRISIM header to the 802.11 packet, which contains among other information the signal strength, and noise level averages for the packet duration. This data was loaded into a DB4o database containing objects for the experiment, packet data, collection window, and statistics.

The experimental data was separated by number of actors, motion of actors, and actor position relative to the transmitter and receiver respectively. From this separation by experiment windows of varying size (1 sec, 5 sec, and 10 sec) were calculated. A variety of plots were generated based upon the entropies of each time window.

Each experiment contained all the packets from the start time to the end time, and collection windows further separated those packets into 1, 5, and 10 second groups. For each experiment, and collection window, the number of packets, min, max, mean, standard deviation, skewness, and kurtosis of the signal strength was calculated. Also, for each experiment and window, the Tsallis entropy was calculated. The experiment class contained data regarding the relative position of each of the individuals in the chamber for the experiment time allowing the output of multiple values of each statistic based upon their positions. Matlab was then used to generate plots of these data sets.

Timing of the minutes was done using the system time on the laptop/receiver. Time was recorded by Person 1 as an approximate measurement, plus or minus a second, so that it could later be correlated with the logs.

Execution of the experiments will now be described with reference to FIG. 6. Tests were performed with up to three individuals within the chamber. Each experiment consisted of a specific number of "actors" either stationary at a specified location or moving between two locations. From 07:22:43 to 10:08:00 the transmitter was in position 13 and the receiver was in position 6. From 10:11:10 to 12:35:00 the transmitter was in position 6 and the receiver was in position 13.

After the initial setup, the chamber was closed and latched with no occupant for approximately five minutes to establish a baseline. After establishing the baseline, Person 1 entered the chamber and moved to position 2. In approximately five minute intervals Person 1 moved from position 2 to position 3, then position 7 then, position 8, position 9, position 10 and 5 respectively waiting as still as possible between positing.

At approximately 08:15:30, Person 1 began moving between positions 2 and 3 and changed to moving between positions 9 and 10 then to moving between positions 3 and 10 each in five minute increments.

At approximately 08:15:30 Person 2 entered the chamber. Persons 1 and 2 stood stationary at positions 2 and 9 respectively, then moved to positions 2 and 7 respectively, then to positions 2 and 3, positions 5 and 7, and finally positions 9 and 10. In each position, each Person remained as still as possible for each approximately five minute increment. Person 2 began moving between positions 2 and 3 while Person 1 remained still in position 7, and then in position 15. While Person 2 was still moving between positions 2 and 3, Person 1 began moving between positions 3 and 10.

At approximately 09:27:30 Person 2 exited the chamber, while Person 1 circled the receiver from positions 2 to 5 to 9 to 7, then back to position 2.

At approximately 09:34:20 Person 2 reentered the chamber and joined Person 1's circular pattern discussed above.

At 09:40:20 Person 3 also joined the pattern.

At 09:46:00 all three Persons exited the chamber, and a final baseline was established.

At 10:11:10 the positions of the transmitter and receiver were swapped and the initial baseline was determined in this configuration of the chamber.

From 10:16:40 through 10:27:48 the initial experiment progression, defined above, was reversed at approximately five minute increments.

Figure 7:
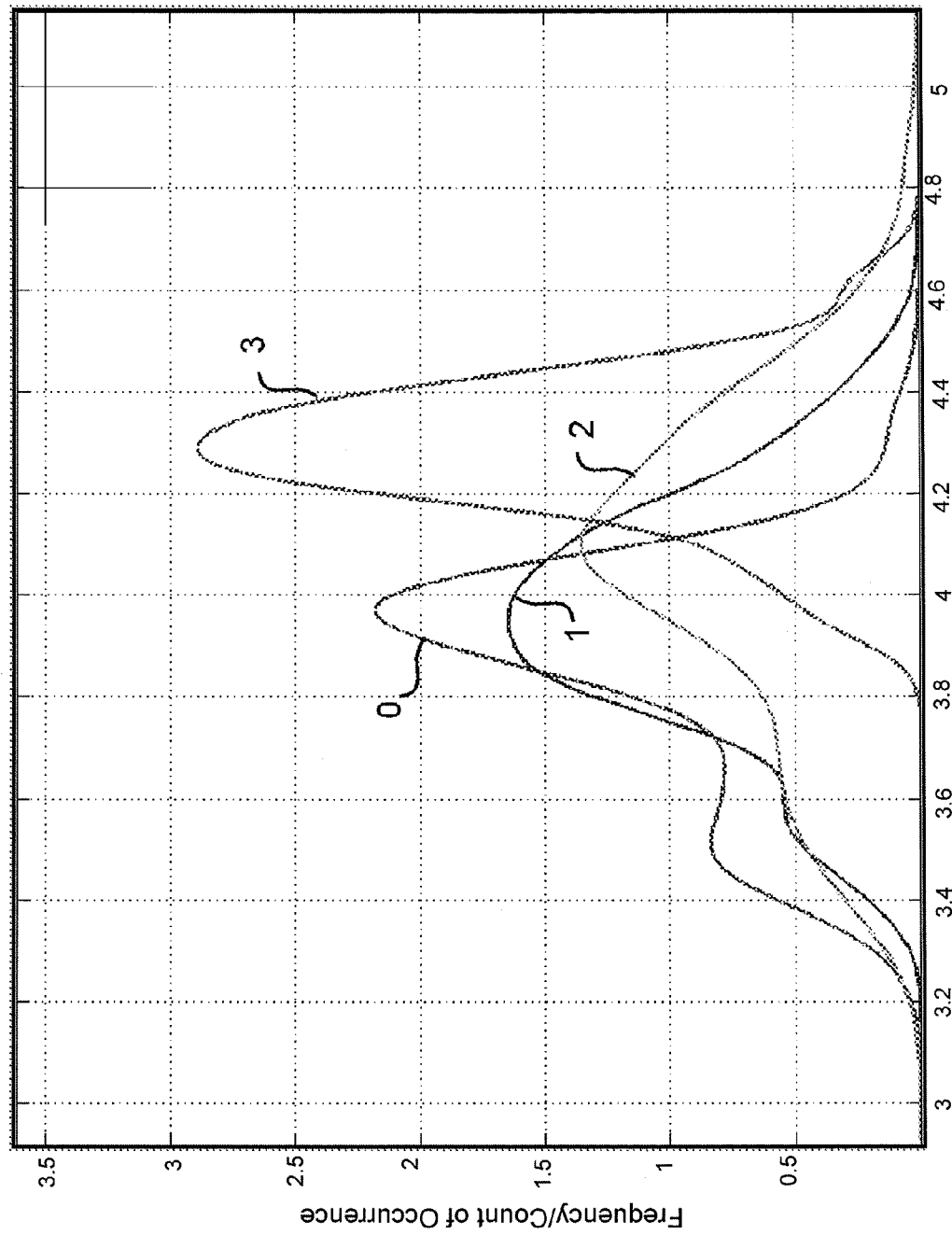
FIG. 7 is a graphical illustration of ten second Tsallis entropy probability density plots, according to an embodiment of the present invention.

As shown in FIG. 7, ten second Tsallis entropy probability density plots are graphically illustrated ("zero actor," "one person," "two people," and "three people"). The results show that the shape of the overall "one person" experiments is nearly identical to that for the "zero actor," although it is spread and shifted very slightly. The shape for the "two people" experiments is shifted slightly more, although the peak is increased by approximately 0.1. The "three people" curve is greatly separated due to a lack of stationary and non blocking experiments with three people.

The results also show that the detection of people in the vicinity of the transmitter is largely affected by the multi-path environment (see FIGS. 8-10).

As shown in FIG. 8a-c, ten second Tsallis entropy probability density plots are illustrated in three separate graphs (see also, FIG. 10a-c). FIG. 8a shows a "one person" Tsallis entropy probability density plot with one person blocking the line of sight of the receiver, and a "one person" Tsallis entropy probability density plot with no people blocking the line of sight of the receiver. FIG. 8b shows a "two person" Tsallis entropy probability density plot with two people blocking the line of sight of the receiver, and a "two person" Tsallis entropy probability density plot with no people blocking the line of sight of the receiver. FIG. 8c shows a "three people" Tsallis entropy probability density plot with three people blocking the line of sight of the receiver.

As illustrated in FIG. 8a-c, the results show that there is a slight change in the Tsallis entropy probability density plot when a person blocks the line of sight of the receiver, however, it is more pronounced when two people block the line of sight.

As shown in FIG. 9a-c, ten second Tsallis entropy probability density plots are illustrated in three separate graphs (see also, FIG. 11a-c). FIG. 9a shows a "one person" Tsallis entropy probability density plot with one person moving, and a "one person" Tsallis entropy probability density plot with no people moving. FIG. 9b shows a "two person" Tsallis entropy probability density plot with two people moving, and a "two person" Tsallis entropy probability density plot with no people moving. FIG. 9c shows a "three people" Tsallis entropy probability density plot with three people moving.

As illustrated in FIG. 9a-c (and FIG. 11a-c), the results show that when the people are moving there is a similar change in the Tsallis entropy probability density plot to that when people are blocking the line of sight as shown in FIG. 8a-c (and FIG. 10a-c). This indicates that the motion causing an alternating beam block and pass is the primary cause of any shift in entropy. The shift to the right indicates higher entropy which implies higher disorder or variability of the signal strength.

The collective results of this Example show that since the system is nearly capable of detecting movement and persons blocking the line of sight between the transmitter and the detector, the environment inside of the anechoic chamber may not be ideal for this tool. This suggests that movement and blocking may complicate inferring the situation in the focus area.

EXAMPLE 4

This Example describes the testing goal of ES2. ES2 was designed to determine if (and confirmed that) the detection of persons within a space was possible. ES2 served as the baseline for experiment sets three and four, described infra. From the results shown in ES2, it was determined that motion was a large factor in the entropy calculation method for activity detection.

This Example relates to a number of tests performed in a conference room (not shown), as opposed to a chamber as described in Example 3. The tests were designed to allow the detection of the presence of individuals within the room. Tests were performed with up to three individuals within the room. Control setups of a specific number of "people/actors," either stationary at a specified location or moving between two locations, were used. Each control setup was repeated twice, once with the transmitter in the center of the grouping of actors and once with the receiver in the center.

The data was collected and analyzed as described in Example 3, supra.

Figure 12:
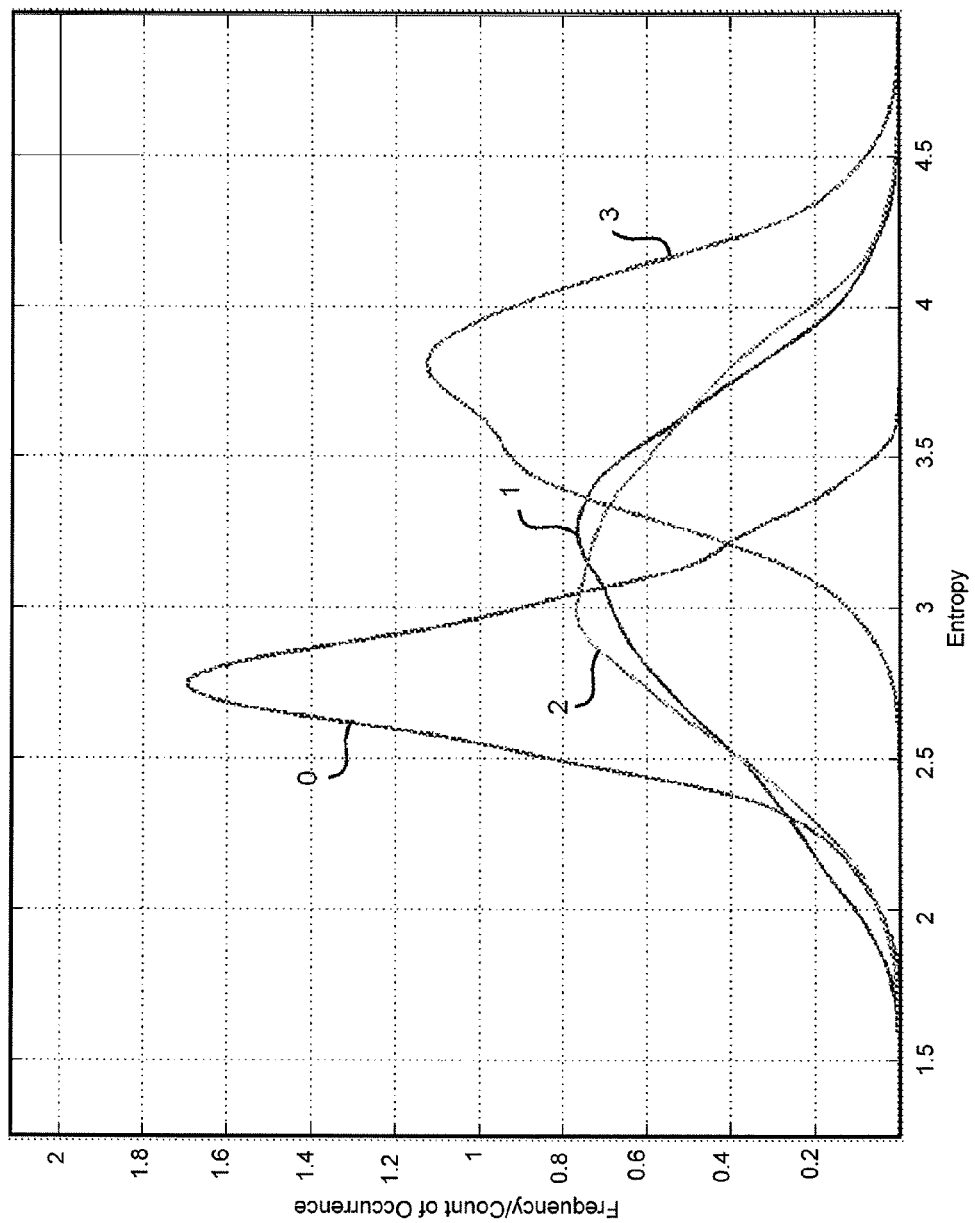
FIG. 12 is a graphical illustration of one second Tsallis entropy probability density plots, according to an embodiment of the present invention.

As shown in FIG. 12, one second Tsallis entropy probability density plots are graphically illustrated ("zero actor," "one person," "two people," and "three people"). The results show that the one second Tsallis Entropy values showed a peak frequency shift of approximately 0.25 from zero actors to one person, and from one person to two people. The peak frequency shifted approximately 0.5 from two to three people, when separated out by number of people with no regard for whether the people were moving. It appears that the drastic difference between the one and two people curves, and the three people curve, is an artifact of there not being a sufficient number of experiments with three actors stationary.

As shown in FIG. 13a-c, one second Tsallis entropy probability density plots are illustrated in three separate graphs. FIG. 13a shows a "one person" Tsallis entropy probability density plot with one person blocking the line of sight of the receiver, and a "one person" Tsallis entropy probability density plot with no people blocking the line of sight of the receiver. FIG. 13b shows a "two person" Tsallis entropy probability density plot with two people blocking the line of sight of the receiver, and a "two person" Tsallis entropy probability density plot with no people blocking the line of sight of the receiver. FIG. 13c shows a "three people" Tsallis entropy probability density plot with three people blocking the line of sight of the receiver.

As illustrated in FIG. 13a-c, the results show that when one or two people blocked the line of sight of the receiver, the frequency of various Tsallis entropy probability density values widened and shifted up approximately 0.25 versus the probability density values with one or two people not blocking the line of sight. There was no data for three actors not blocking the line of sight.

As shown in FIG. 14a-c, one second Tsallis entropy probability density plots are illustrated in three separate graphs. FIG. 14a shows a "one person" Tsallis entropy probability density plot with one person moving, and a "one person" Tsallis entropy probability density plot with no people moving. FIG. 14b shows a "two person" Tsallis entropy probability density plot with two people moving, and a "two person" Tsallis entropy probability density plot with no people moving. FIG. 14c shows a "three people" Tsallis entropy probability density plot with three people moving.

As illustrated in FIG. 14a-c, the results show that the probability density of the entropies sharpened slightly and shifted up approximately 0.6 when one or two people were moving versus not moving. There was no data for three actors standing in place.

Figure 15:
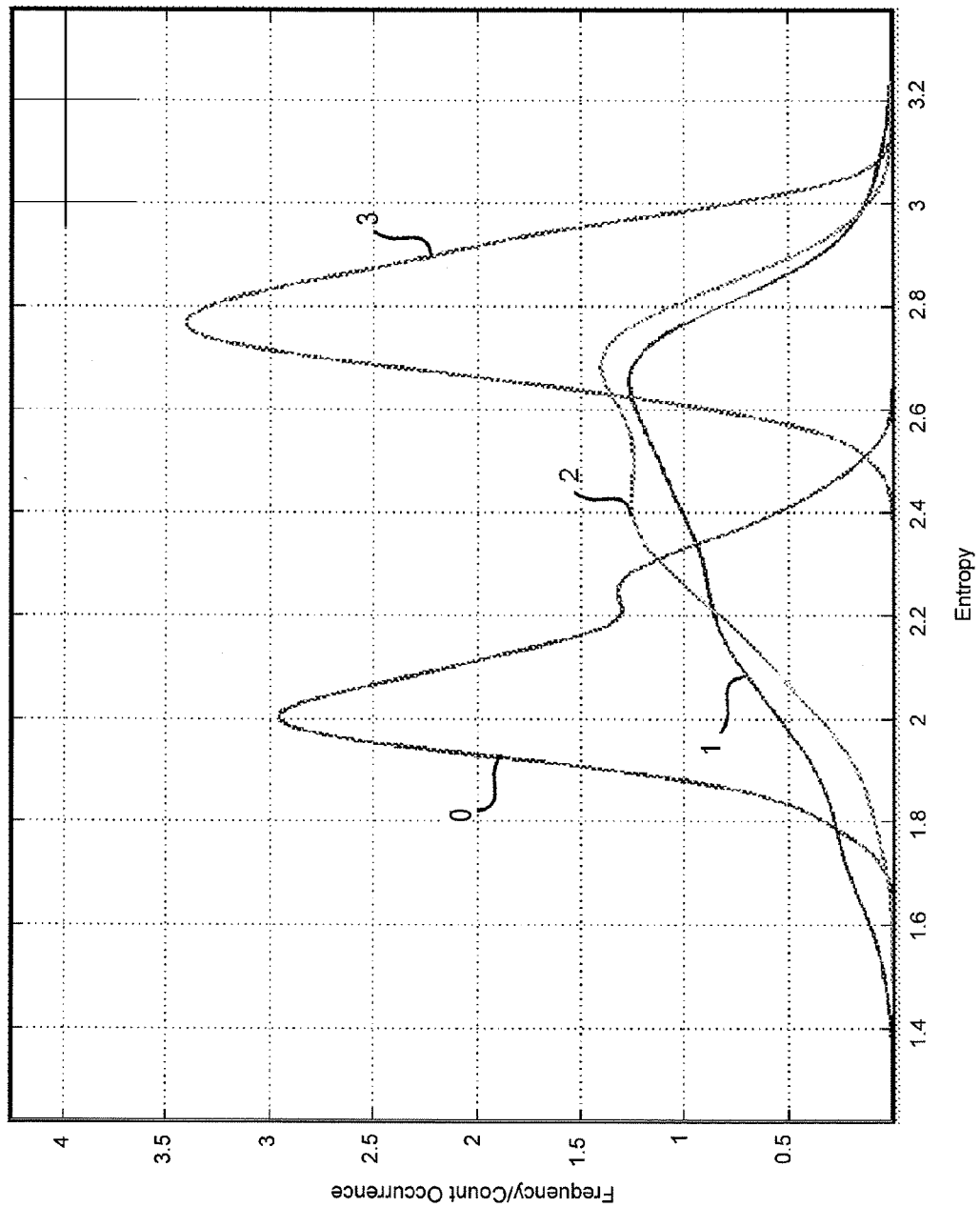
FIG. 15 is a graphical illustration of five second Tsallis entropy probability density plots, according to an embodiment of the present invention.

As shown in FIG. 15, five second Tsallis entropy probability density plots are graphically illustrated ("zero actor," "one person," "two people," and "three people"). The results show that for 5 second windows the overall number of actor/people graphics showed a similar pattern. The zero actor probability density peak was around 2.0 the one and two people probability densities peaked around the same value of 2.6 and the three actor density peaked around 2.8.

As shown in FIG. 16a-c, five second Tsallis entropy probability density plots are illustrated in three separate graphs. FIG. 16a shows a "one person" Tsallis entropy probability density plot with one person moving, and a "one person" Tsallis entropy probability density plot with no people moving. FIG. 16b shows a "two person" Tsallis entropy probability density plot with two people moving, and a "two person" Tsallis entropy probability density plot with no people moving. FIG. 16c shows a "three people" Tsallis entropy probability density plot with three people moving.

As illustrated in FIG. 16a-c, the results show that motion again sharpened the probability density curve and increased the peak by between 0.6 and 0.75.

As shown in FIG. 17a-c, five second Tsallis entropy probability density plots are illustrated in three separate graphs. FIG. 17a shows a "one person" Tsallis entropy probability density plot with one person blocking the line of sight of the receiver, and a "one person" Tsallis entropy probability density plot with no people blocking the line of sight of the receiver. FIG. 17b shows a "two person" Tsallis entropy probability density plot with two people blocking the line of sight of the receiver, and a "two person" Tsallis entropy probability density plot with no people blocking the line of sight of the receiver. FIG. 17c shows a "three people" Tsallis entropy probability density plot with three people blocking the line of sight of the receiver.

As illustrated in FIG. 17a-c, the results show that one or two people blocking the line of sight of the receiver both caused approximately a 0.6 point shift in the peak Tsallis entropy probability density value and widened the curve.

Figure 18:
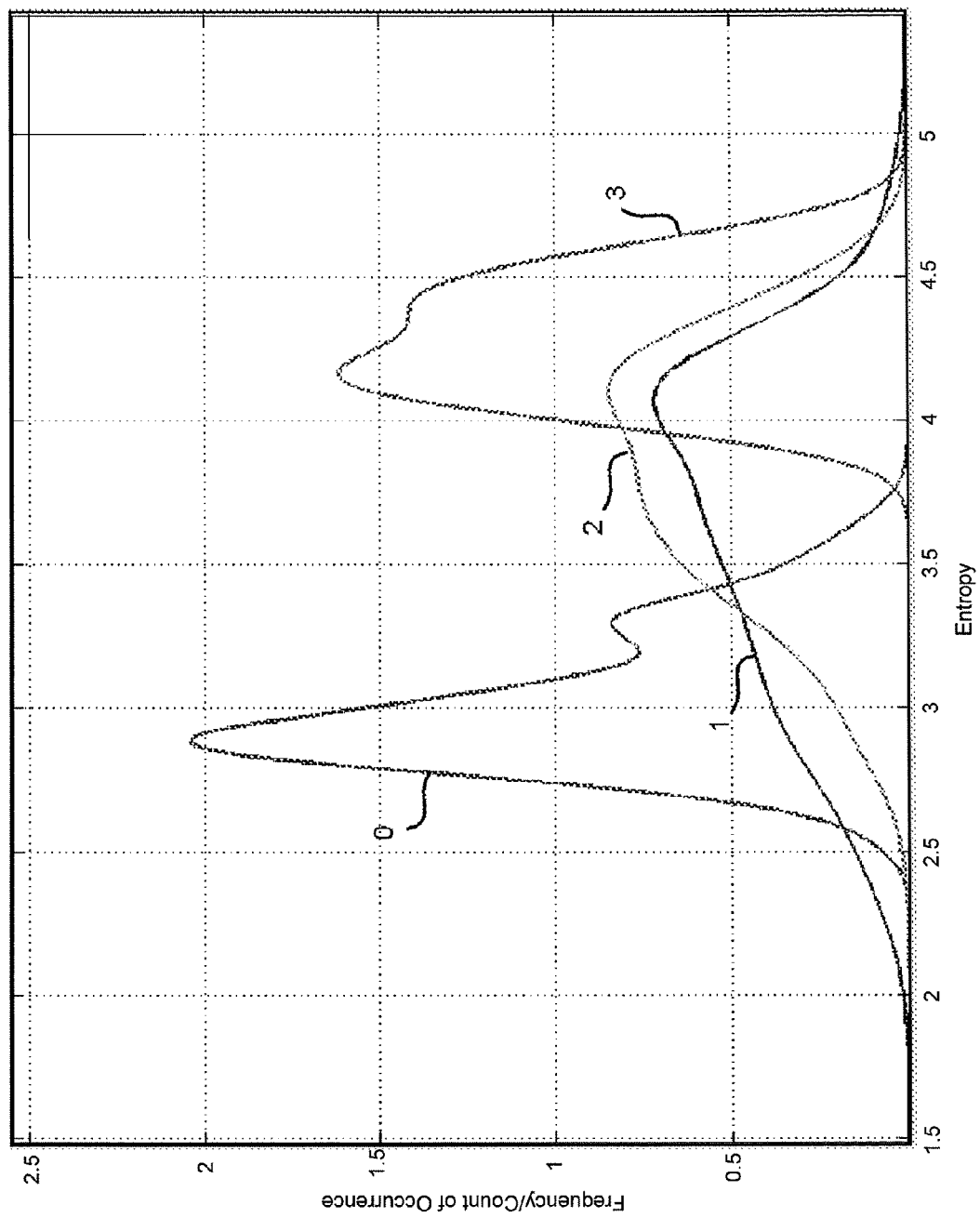
FIG. 18 is a graphical illustration often second Tsallis entropy probability density plots, according to an embodiment of the present invention.

As shown in FIG. 18, ten second Tsallis entropy probability density plots are graphically illustrated ("zero actor," "one person," "two people," and "three people"). The results show that for the 10 second windows, the peak values of the Tsallis entropy probability density curves were nearly the same as that of the five second windows. The general shape of the windows changed producing a distinct second peak in the zero actor and a near peak in the three actor sets.

Figure 19:
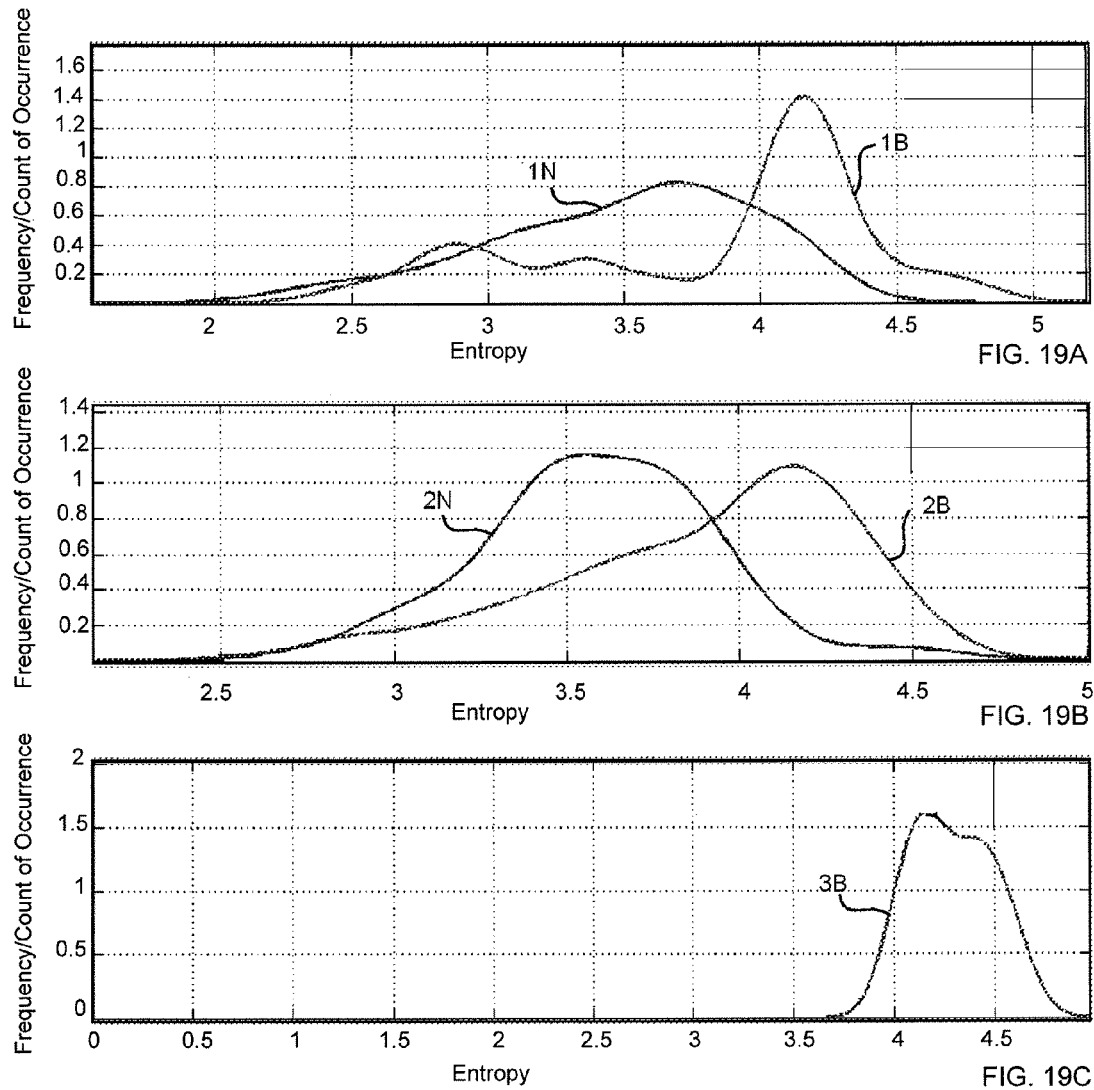
FIG. 19a-c is a graphical illustration of ten second Tsallis entropy probability density plots in three separate graphs, according to an embodiment of the present invention.

As shown in FIG. 19a-c, ten second Tsallis entropy probability density plots are illustrated in three separate graphs. FIG. 19a shows a "one person" Tsallis entropy probability density plot with one person blocking the line of sight of the receiver, and a "one person" Tsallis entropy probability density plot with no people blocking the line of sight of the receiver. FIG. 19b shows a "two person" Tsallis entropy probability density plot with two people blocking the line of sight of the receiver, and a "two person" Tsallis entropy probability density plot with no people blocking the line of sight of the receiver. FIG. 19c shows a "three people" Tsallis entropy probability density plot with three people blocking the line of sight of the receiver.

As illustrated in FIG. 19a-c, the results show that for one and two people blocking the line of sight with ten second windows sharpened the peaks of the Tsallis entropy probability density curves slightly. Yet, the full span of the curves increased slightly. The upshift in the peak was around 0.6 for both.

Figure 20:
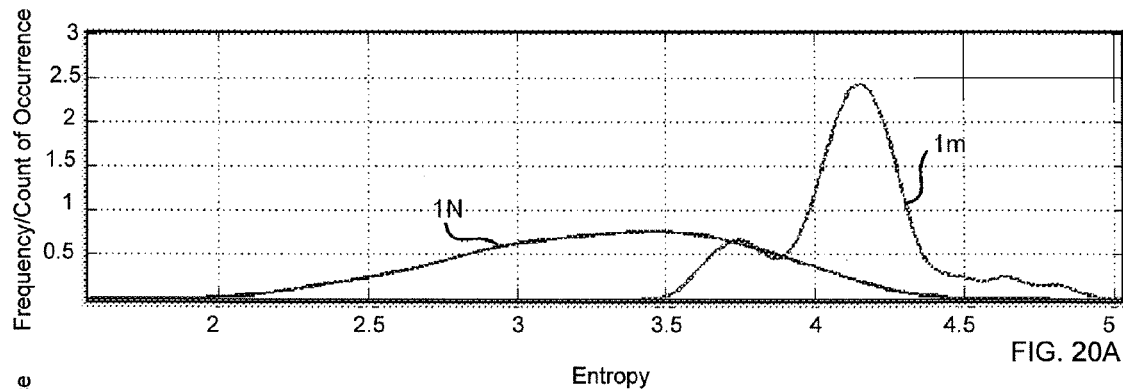
FIG. 20a-c is a graphical illustration of ten second Tsallis entropy probability density plots in three separate graphs, according to an embodiment of the present invention.
Figure 20:
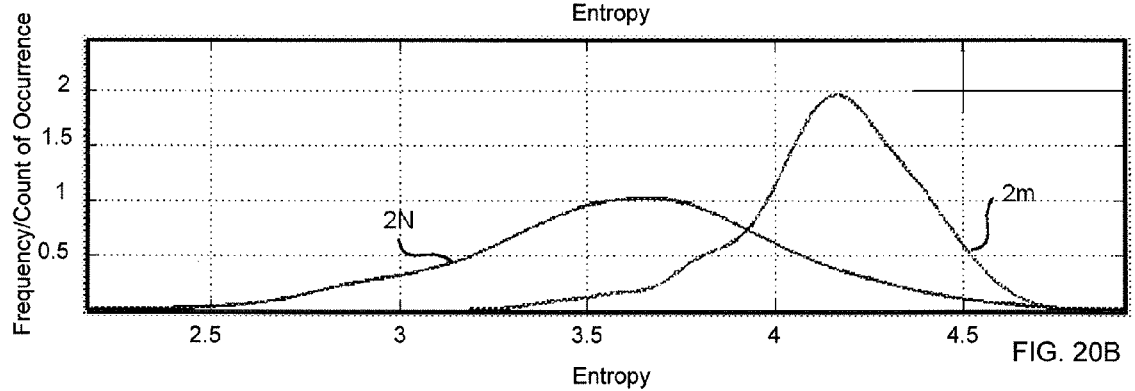
Figure 20:
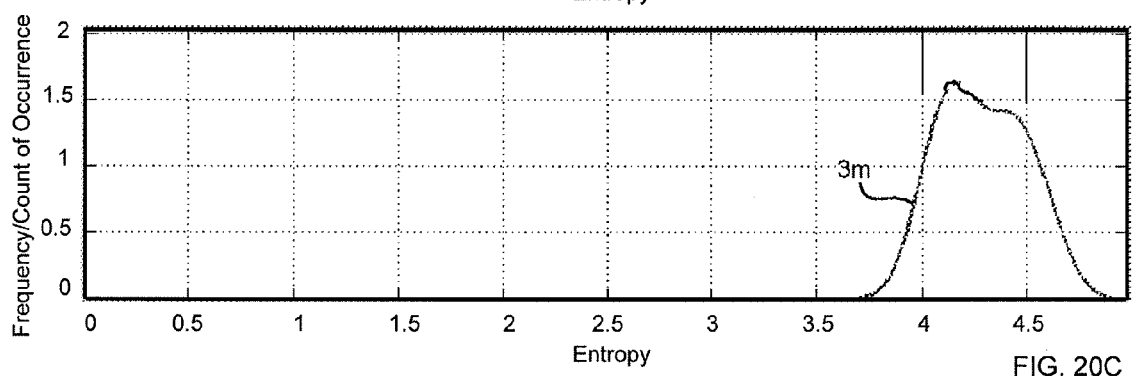

As shown in FIG. 20a-c, ten second Tsallis entropy probability density plots are illustrated in three separate graphs. FIG. 20a shows a "one person" Tsallis entropy probability density plot with one person moving, and a "one person" Tsallis entropy probability density plot with no people moving. FIG. 20b shows a "two person" Tsallis entropy probability density plot with two people moving, and a "two person" Tsallis entropy probability density plot with no people moving. FIG. 20c shows a "three people" Tsallis entropy probability density plot with three people moving.

As illustrated in FIG. 20a-b, the results show that the presence of motion again sharpened Tsallis entropy probability density curve, and shifted up the peak by roughly 0.7.

EXAMPLE 5

This Example describes the testing goal of ES3. ES3 was designed to determine if (and confirmed that) motion was a significant factor in the Tsallis entropy probability density calculation, and that the line of sight blocking shift behavior is overridden by number of actors/people when all are in motion.

As described in Example 4, this Example relates to a number of tests performed in a conference room (not shown). The tests were designed to allow the detection of the presence of individuals within the room. Tests were performed with up to three individuals within the room. Control setups of a specific number of "people/actors," either stationary at a specified location or moving between two locations, were used. Each control setup was repeated twice, once with the transmitter in the center of the grouping of actors and once with the receiver in the center.

The data was collected and analyzed as described in Example 3, supra.

Figure 21:
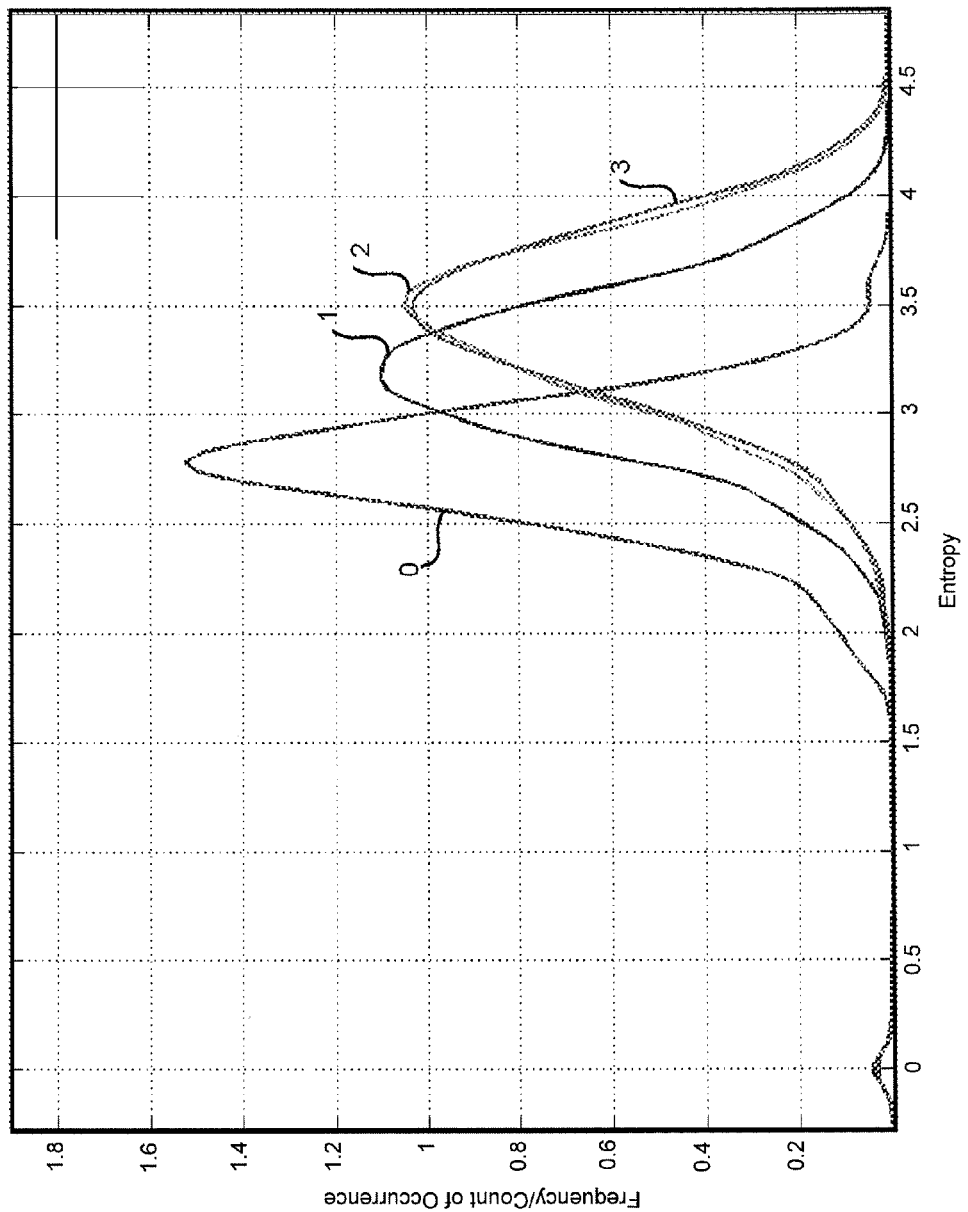
FIG. 21 is a graphical illustration of one second Tsallis entropy probability density plots, according to an embodiment of the present invention.

As shown in FIG. 21, one second Tsallis entropy probability density plots are graphically illustrated ("zero actor," "one person," "two people," and "three people"). The results show that the one second Tsallis Entropy probability density curves were shifted by approximately 0.5 between zero actors and one person. The difference between one and two people was approximately 0.25, and from two to three people the difference was negligible. To compare this with geometric effects referring back to FIG. 19, the probability curve based upon one person blocking the line of sight shifted up by about 0.25, while for two or three actors the there was almost no change. No data was collected regarding stationary occupants for ES3.

Figure 22:
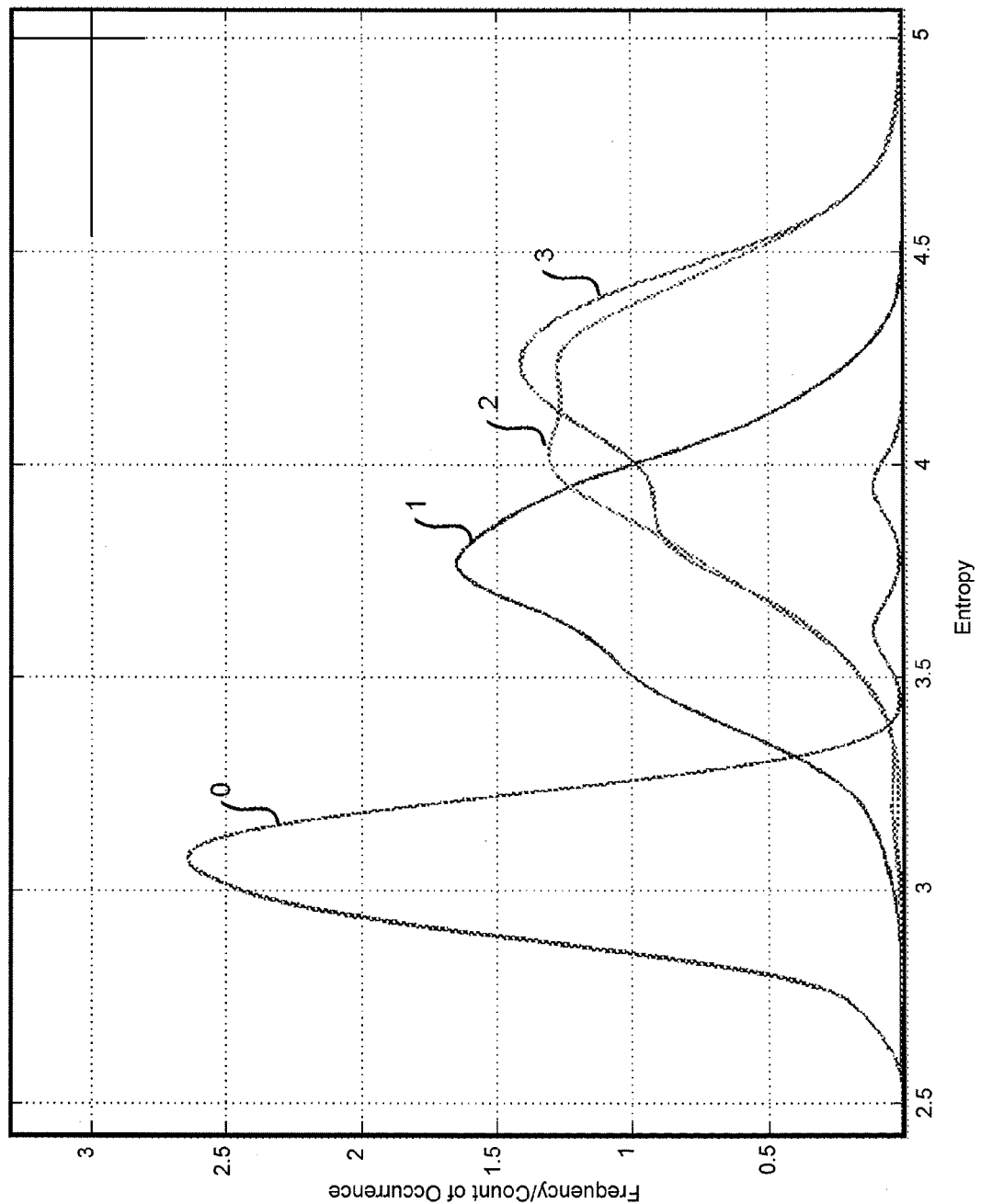
FIG. 22 is a graphical illustration of five second Tsallis entropy probability density plots, according to an embodiment of the present invention.

As shown in FIG. 22, five second Tsallis entropy probability density plots are graphically illustrated ("zero actor," "one person," "two people," and "three people"). The results show that for the five second windows the overall Tsallis entropy probability density shifted up by approximately 0.7 between zero actors and one person. From one to two people, the peak shifted up by roughly 0.2, and the peak of the three people curve similarly shifted up by approximately 0.2 from the peak of the two people peak.

As shown in FIG. 23a-c, five second Tsallis entropy probability density plots are illustrated in three separate graphs. FIG. 23a shows a "one person" Tsallis entropy probability density plot with one person blocking the line of sight of the receiver, and a "one person" Tsallis entropy probability density plot with no people blocking the line of sight of the receiver. FIG. 23b shows a "two person" Tsallis entropy probability density plot with two people blocking the line of sight of the receiver, and a "two person" Tsallis entropy probability density plot with no people blocking the line of sight of the receiver. FIG. 23c shows a "three people" Tsallis entropy probability density plot with three people blocking the line of sight of the receiver, and a "three people" Tsallis entropy probability density plot with no people blocking the line of sight of the receiver.

As illustrated in FIG. 23, the results show that one person blocking the line of sight caused a increase of just over 0.1 in the peak Tsallis entropy probability density value, while two people blocking the line of sight actually caused a decrease of nearly 0.1. With three people blocking the line of sight caused a barely noticeable increase.

Figure 24:
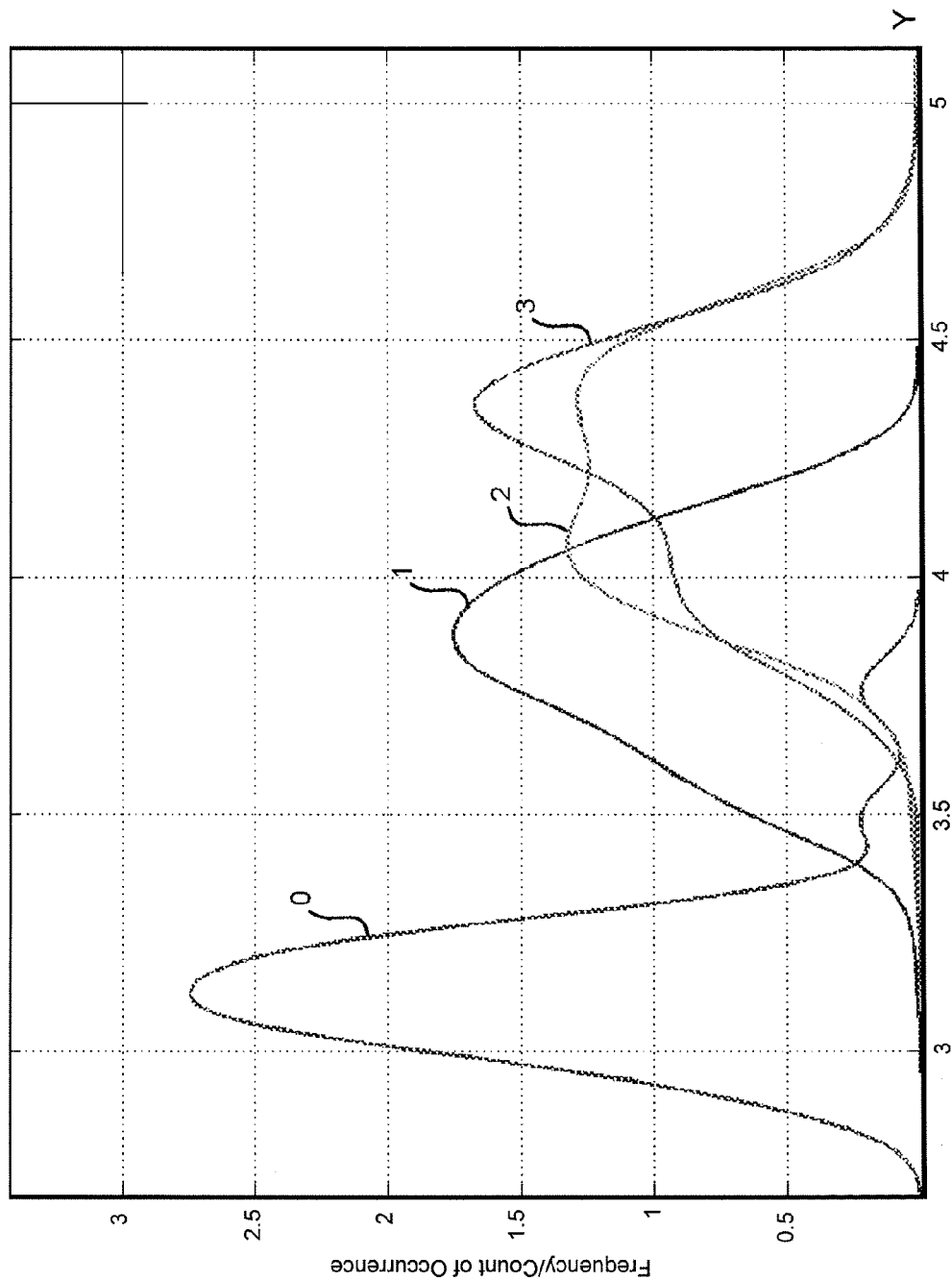
FIG. 24 is a graphical illustration often second Tsallis entropy probability density plots, according to an embodiment of the present invention.

As shown in FIG. 24, ten second Tsallis entropy probability density plots are graphically illustrated ("zero actor," "one person," "two people," and "three people"). The results show that the ten second windows behaved similar to the five second plots, however, with slightly wider curves in all respects.

EXAMPLE 6

This Example describes the testing goal of ES4. ES4 was designed to determine if (and confirmed that) a directional antenna would not block out as significant a portion of the interference caused by the user (as was expected). However, the directional antenna did lower the entropy in every case. Also, this Example shows that the distance from the transmitter to the receiver made a significant difference in the entropy of the received signal.

This Example relates to a number of tests performed in a conference room (not shown). The tests were designed to allow the detection of the presence of individuals within the room. Tests were performed with up to three individuals within the room. Control setups of a specific number of "people/actors" at a specified location were used. Each control setup was repeated four times—twice with the transmitter nearer to the receiver than the grouping of actors/people, and twice with the transmitter offset farther from the receiver. Each control setup and transmitter location were tested with and without a "simulated user" in very close proximity to the receiver. Three different antennae were used on three separate collection platforms. Two yagi directional antennae were positioned such that one was directed at the transmitter and the other was 45 degrees offset from the line of sight to the transmitter. The third antenna was onmi-directional.

The data was collected and analyzed in part as described in Example 3, supra. The experimental data was separated by number of actors/people, motion of actors, and actor position relative to the transmitter and receiver respectively. From this separation by experiment, windows of 10 seconds were calculated. A variety of plots were generated based upon the entropies of each time window.

Figure 25:
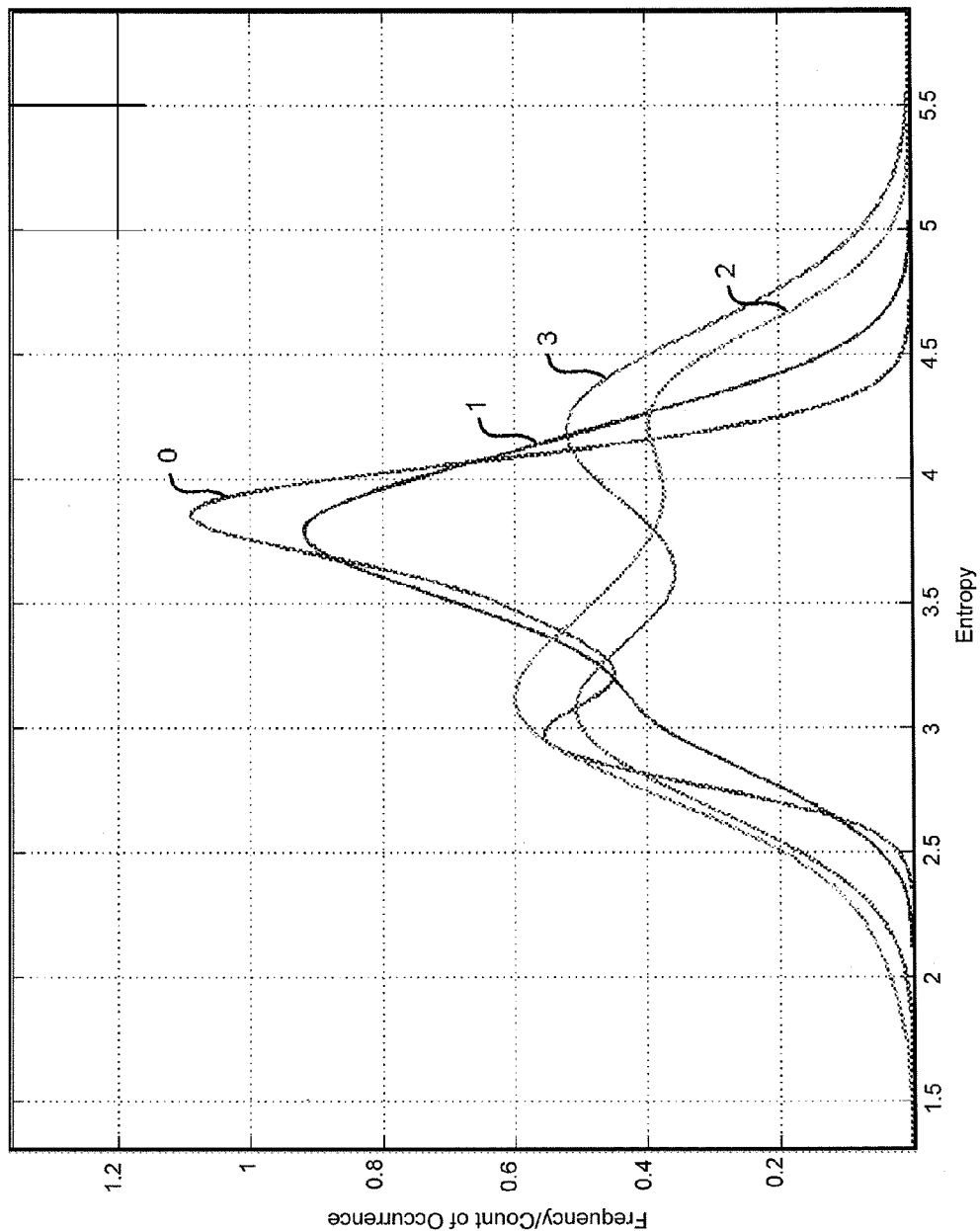
FIG. 25 is a graphical illustration often second Tsallis entropy probability density plots, according to an embodiment of the present invention.

As shown in FIG. 25, ten second Tsallis entropy probability density plots are graphically illustrated ("zero actor," "one person," "two people," and "three people"). An omni directional antenna was used in the experiment illustrated in FIG. 25. Only Tsallis Entropies from the ten second windows were analyzed. The results show that for the omni directional antenna, all Tsallis entropy probability densities appear nearly the same regardless of the number of actors. Each additional actor widens the curve and shifts the curve up slightly.

Figure 26:
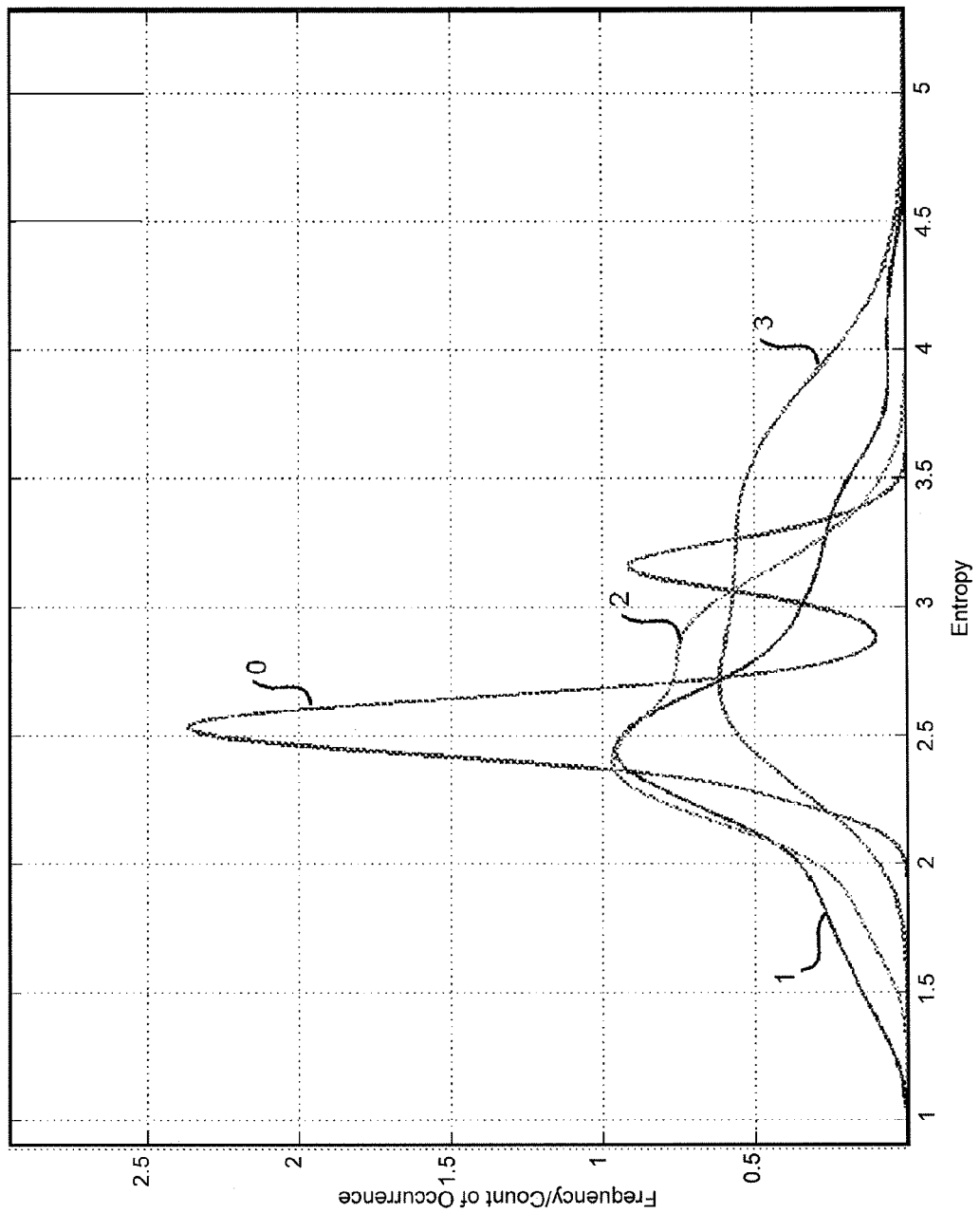
FIG. 26 is a graphical illustration often second Tsallis entropy probability density plots, according to an embodiment of the present invention.

As shown in FIG. 26, ten second Tsallis entropy probability density plots are graphically illustrated ("zero actor," "one person," "two people," and "three people"). A directional antenna was used in the experiment illustrated in FIG. 26. The results show that with a directional antenna pointed at the receiver, the curves are somewhat more distinguishable, yet the peak values for zero actors, one person, and two people still overlapped.

The overall conference room experiments (ES2-ES4) show probability distributions that exhibit distinguishable behavior for a number of actors.

The overall pattern throughout the experiments (ES1-ES4) has shown that motion in the vicinity of the transmitter/receiver pair generally increases peak of the entropy probability density more than the presence of additional people, as does blocking the line of sight. One person blocking the line of sight has a similar effect to two people blocking the line of sight. Therefore, it appears that blocking the line of sight parameter is easily distinguishable from the non blocking case. One actor moving appears similarly to two actors moving, and this also indicates that the motion is easily distinguishable.

Moreover, longer time windows give shaper contrasts in the probability densities. It is unclear if this is due to the fixed sampling duration, and therefore fewer entropy values from which to determine the probability density, or due to the longer window length allowing a more accurate estimate of each entropy value.

It supports the assertion that provided the target of observation is moving within or near the line of sight between the transmitter and receiver, the system can detect presence.

While the invention is susceptible to various modifications, and alternative forms, specific examples thereof have been shown in the drawing and are herein described in detail. It should be understood, however, that the invention is not to be limited to the particular forms or methods disclosed, but to the contrary, the invention is to cover all modifications, equivalents and alternatives falling within the spirit and scope of the claimed invention.

Definitions

The following definitions are provided to facilitate claim interpretation:

Present invention: means at least some embodiments of the present invention; references to various feature(s) of the "present invention" throughout this document do not mean that all claimed embodiments or methods include the referenced feature(s).

First, second, third, etc. ("ordinals"): Unless otherwise noted, ordinals only serve to distinguish or identify (e.g., various members of a group); the mere use of ordinals implies neither a consecutive numerical limit nor a serial limitation.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control. If the definitions provided above are broader than the ordinary, plain, and accustomed meanings in some aspect, then the above definitions shall be considered to broaden the claim accordingly.

To the extent that a patentee may act as its own lexicographer under applicable law, it is hereby further directed that all words appearing in the claims section, except for the above-defined words, shall take on their ordinary, plain, and accustomed meanings (as generally shown by documents such as dictionaries and/or technical lexicons), and shall not be considered to be specially defined in this specification. In the situation where a word or term used in the claims has more than one alternative ordinary, plain and accustomed meaning, the broadest definition that is consistent with technological feasibility and not directly inconsistent with the specification shall control.

Unless otherwise explicitly provided in the claim language, steps in method steps or process claims need only be performed in the same time order as the order the steps are recited in the claim only to the extent that impossibility or extreme feasibility problems dictate that the recited step order (or portion of the recited step order) be used. This broad interpretation with respect to step order is to be used regardless of whether the alternative time ordering(s) of the claimed steps is particularly mentioned or discussed in this document.

What is claimed is:

1. A RF signal collection and monitoring system comprising:
    a. an RF transmitter;
    b. a RF signal collection platform comprising means for: (i) collecting RF signals wirelessly transmitted from said RF transmitter; (ii) determining an estimate of received RF signal strength over at least one predetermined time period; (iii) calculating Tsallis entropy of said determined estimate of received RF signal strength; and (iv) determining human presence and/or activity in a vicinity of said RF transmitter based on a change in Tsallis entropy over time.

2. The RF signal collection and monitoring system of claim 1, wherein said RF transmitter is a wireless access point.

3. The RF signal collection and monitoring system of claim 1, wherein said RF transmitter and said RF signal collection platform are located in separate rooms in the same building.

4. The RF signal collection and monitoring system of claim 1, wherein said RF transmitter and said RF signal collection platform are located in separate buildings.

5. The RF signal collection and monitoring system of claim 1, wherein no communication link is established between said RF transmitter and said RF signal collection platform.

6. The RF signal collection and monitoring system of claim 2, wherein said means for collecting further comprises means for collecting RF signals comprising data packets wirelessly transmitted from said wireless access point, and wherein said collected data packets comprise Beacon data packets.

7. The RF signal collection and monitoring system of claim 1, wherein said RF signal collection platform further comprises means for estimating a first histogram of the determined estimate of received RF signal strength over a first window of time within said at least one predetermined time period.

8. The RF signal collection and monitoring system of claim 7, wherein said RF signal collection platform further comprises means for normalizing said first histogram.

9. The RF signal collection and monitoring system of claim 8, wherein said RF signal collection platform further comprises means for filtering the calculated Tsallis entropy.

10. A method of determining human presence and/or activity in at least a partially bounded region comprising the steps of:
    a. collecting RF signals wirelessly transmitted from an RF transmitter within said at least partially bounded region;
    b. determining an estimate of received RF signal strength over at least one predetermined time period,
    c. calculating Tsallis entropy of said determined estimate of received RF signal strength; and
    d. determining said human presence and/or activity based on a change in Tsallis entropy over time.

11. The method of claim 10, further comprising the step of estimating a first histogram of the determined estimate of received RF signal strength over a first window of time within said at least one predetermined time period prior to the step of calculating.

12. The method of claim 11, wherein the step of estimating a first histogram further comprises the step of normalizing said first histogram.

13. The method of claim 12, wherein the step of calculating further comprises the step of calculating the Tsallis entropy of said determined estimate of received RF signal strength based on at least said normalized first histogram.

14. The method of claim 13, further comprising the step of filtering the calculated Tsallis entropy.

15. The method of claim 14, further comprising graphically representing said filtered calculated Tsallis entropy as a function of time, wherein a plotted local extremum is indicative of said human presence and/or activity.

16. The method of claim 10, wherein said RF transmitter is a wireless access point.

17. The method of claim 16, wherein the step of collecting further comprises collecting RF signals comprising data packets wirelessly transmitted from said wireless access point, and wherein said collected data packets comprise Beacon data packets.

18. The method of claim 11, wherein said first window of time comprises a time period of up to ten seconds.

19. A method of determining activity in at least a partially bounded region comprising the steps of:

a. collecting a plurality of data packets wirelessly transmitted from a wireless transmitter within said at least partially bounded region;

b. determining an estimate of received signal strength of each collected data packet over at least one predetermined time period, c. estimating and normalizing a first histogram of the determined estimate of received signal strength of each collected data packet over a first window of time within said at least one predetermined time period, d. calculating Tsallis entropy of said determined estimate of received signal strength of each collected data packet based on at least said normalized first histogram, e. filtering the calculated Tsallis entropy, and f. graphically representing said filtered calculated Tsallis entropy as a function of time, wherein a plotted local extremum is indicative of said activity.

20. The method of claim 19, wherein said activity is indicative of the presence of humans in said at least partially bounded region.

* * * * *